US012700210B2

(12) United States Patent
Kang et al.

(10) Patent No.: US 12,700,210 B2
(45) Date of Patent: Aug. 4, 2026

(54) IMAGE SEGMENTATION MODEL QUANTIZATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Yang Kang, Shenzhen (CN); Shuang Sun, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 437 days.

(21) Appl. No.: 18/140,144

(22) Filed: Apr. 27, 2023

(65) Prior Publication Data

US 2023/0260245 A1     Aug. 17, 2023

Related U.S. Application Data

(63) Continuation of application No. PCT/CN2022/100106, filed on Jun. 21, 2022.

(30) Foreign Application Priority Data

Jul. 20, 2021     (CN) .......................... 202110817137.6

(51) Int. Cl.
*G06V 10/26*          (2022.01)
*G06V 10/776*         (2022.01)
          (Continued)

(52) U.S. Cl.
CPC ............ *G06V 10/26* (2022.01); *G06V 10/776* (2022.01); *G06V 10/82* (2022.01); *G06V 30/148* (2022.01); *G06V 40/162* (2022.01)

(58) Field of Classification Search
CPC ...... G06V 10/26; G06V 10/776; G06V 10/82; G06V 30/148; G06V 40/162; G06V 40/161; G06N 3/0495
See application file for complete search history.

(56) References Cited

U.S. PATENT DOCUMENTS

2009/0141797 A1     6/2009   Jia
2011/0116711 A1     5/2011   Wang et al.
          (Continued)

FOREIGN PATENT DOCUMENTS

CN          107688855 A   *   2/2018   ............. G06N 3/084
CN          109388779 A       2/2019
          (Continued)

OTHER PUBLICATIONS

International Search Report and Written Opinion for International Application No. PCT/CN2022/100106 mailed Aug. 26, 2022 including translations (12 pages).

(Continued)

*Primary Examiner* — Jennifer Mehmood
*Assistant Examiner* — Vaisali Rao Koppolu
(74) *Attorney, Agent, or Firm* — Crowell & Moring LLP

(57)          ABSTRACT

Embodiments of this application disclose an image segmentation model quantization in the field of computer technologies. A method includes: acquiring a first image segmentation model, the first image segmentation model including a plurality of first operators, a concatenation layer, and a second operator; determining an input range of each of the plurality of first operators and the second operator, and updating a quantization parameter of each operator based on the input range of each operator and a target output range, so that the quantization parameter of each operator converges to a quantization parameter corresponding to the target output range; quantizing a network parameter of the concatenation layer based on the quantization parameter corresponding to the target output range, to obtain a quantized image segmentation model; and calling the quantized image segmentation model to perform an image segmentation task.

18 Claims, 9 Drawing Sheets

(51) Int. Cl.
    *G06V 10/82*     (2022.01)
    *G06V 30/148*    (2022.01)
    *G06V 40/16*     (2022.01)

(56) References Cited

U.S. PATENT DOCUMENTS

| | | | |
|---|---|---|---|
| 2017/0061620 A1 | 3/2017 | Park et al. | |
| 2020/0302299 A1 | 9/2020 | Nagel et al. | |
| 2021/0383538 A1* | 12/2021 | Deasy | G06T 3/4053 |
| 2022/0292278 A1* | 9/2022 | Roberts | G06T 7/40 |

FOREIGN PATENT DOCUMENTS

| | | | | |
|---|---|---|---|---|
| CN | 110059733 A | 7/2019 | | |
| CN | 110334802 A | 10/2019 | | |
| CN | 111401550 A | 7/2020 | | |
| CN | 111612147 A | 9/2020 | | |
| CN | 112561933 A | * 3/2021 | | G06N 3/045 |
| CN | 112580492 A | 3/2021 | | |
| WO | WO-2022088063 A1 | * 5/2022 | | G06N 3/04 |

OTHER PUBLICATIONS

Supplementary European Search Report dated Nov. 26, 2024 issued in European Patent Application No. 228450631, 9 pages.

Fournarakis et al., "In-Hindsight Quantization Range Estimation for Quantized Training" 2021 IEEE/CVF Conference on Computer Vision and Pattern Recognition Workshops, Jun. 19, 2021, 8 pages.

Kluska et al. "Post-training Quantization Methods for Deep Learning Models" Mar. 4, 2020, 13 pages.

AskariHemmat et al., "U-Net Fixed-Point Quantization for Medical Image Segmentation" Aug. 2, 2019, 15 pages.

Wu et al., "Integer Quantization for Deep Learning Inference: Principles and Empirical Evaluation" Apr. 20, 2020, 20 pages.

Chinese-language Office Action issued in Chinese Application No. 202110817137.6 dated Dec. 10, 2025 (6 pages).

Vo Dinh Minh Nhat, et al., Proceedings of the Fourth International Symposium on Signal Processing and Information Technology, 2004 "Dynamic Segmental Vector Quantization in Isolated-word Speech Recognition" pp. 1-5, dated May 13, 2005.

* cited by examiner

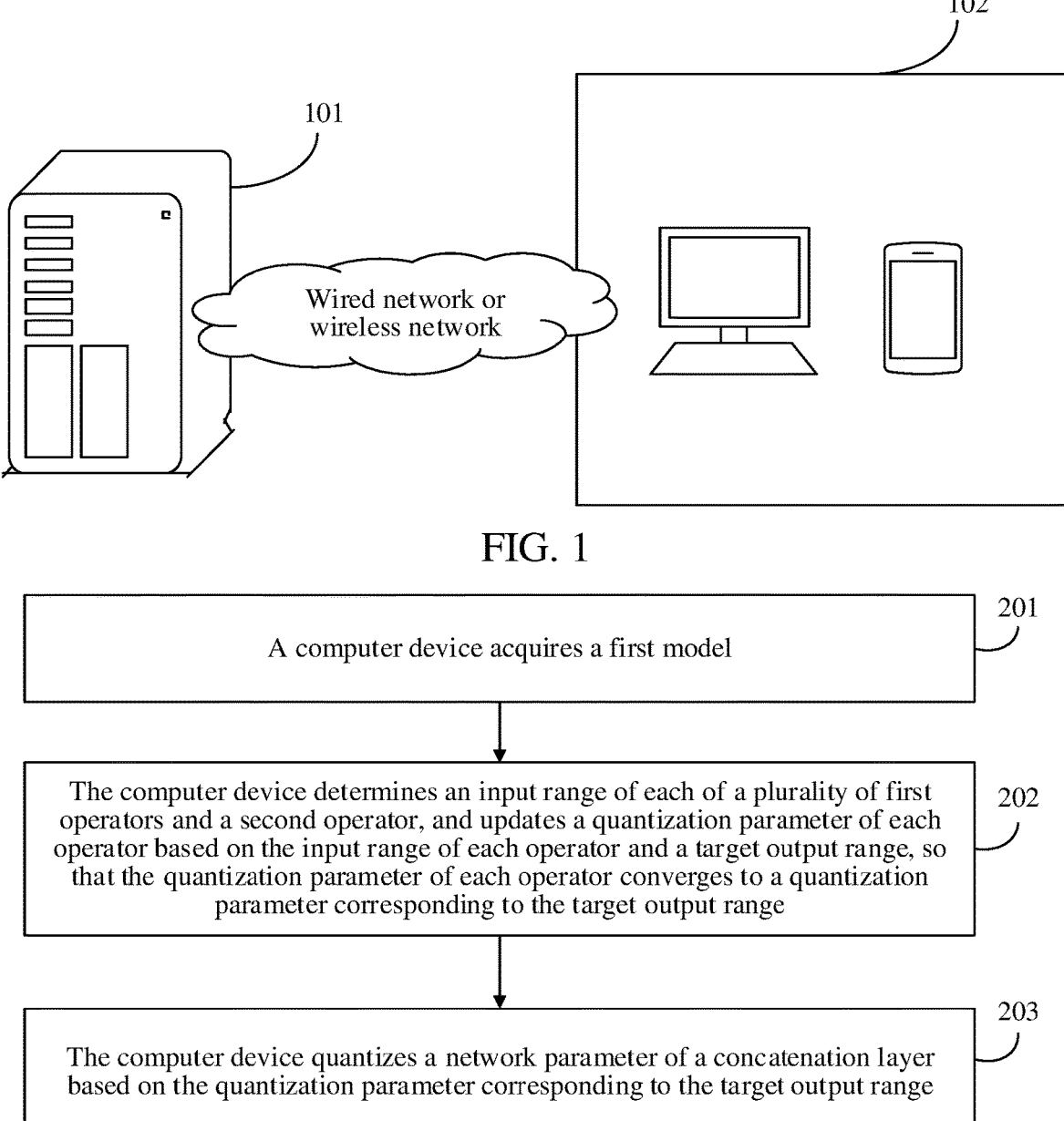

FIG. 1

A computer device acquires a first model ⟋201

The computer device determines an input range of each of a plurality of first operators and a second operator, and updates a quantization parameter of each operator based on the input range of each operator and a target output range, so that the quantization parameter of each operator converges to a quantization parameter corresponding to the target output range ⟋202

The computer device quantizes a network parameter of a concatenation layer based on the quantization parameter corresponding to the target output range ⟋203

FIG. 2

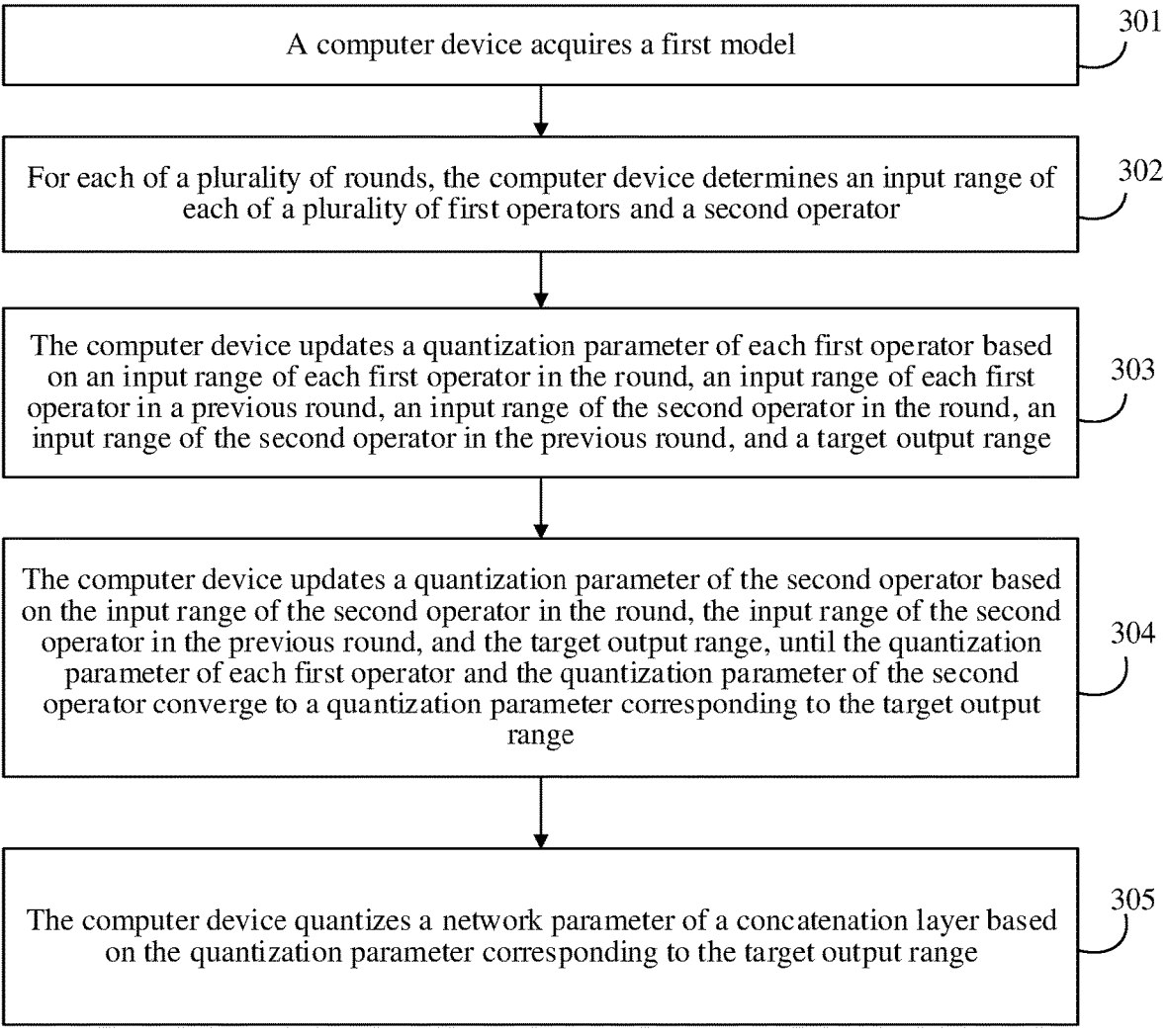

A computer device acquires a first model — 301

For each of a plurality of rounds, the computer device determines an input range of each of a plurality of first operators and a second operator — 302

The computer device updates a quantization parameter of each first operator based on an input range of each first operator in the round, an input range of each first operator in a previous round, an input range of the second operator in the round, an input range of the second operator in the previous round, and a target output range — 303

The computer device updates a quantization parameter of the second operator based on the input range of the second operator in the round, the input range of the second operator in the previous round, and the target output range, until the quantization parameter of each first operator and the quantization parameter of the second operator converge to a quantization parameter corresponding to the target output range — 304

The computer device quantizes a network parameter of a concatenation layer based on the quantization parameter corresponding to the target output range — 305

FIG. 3

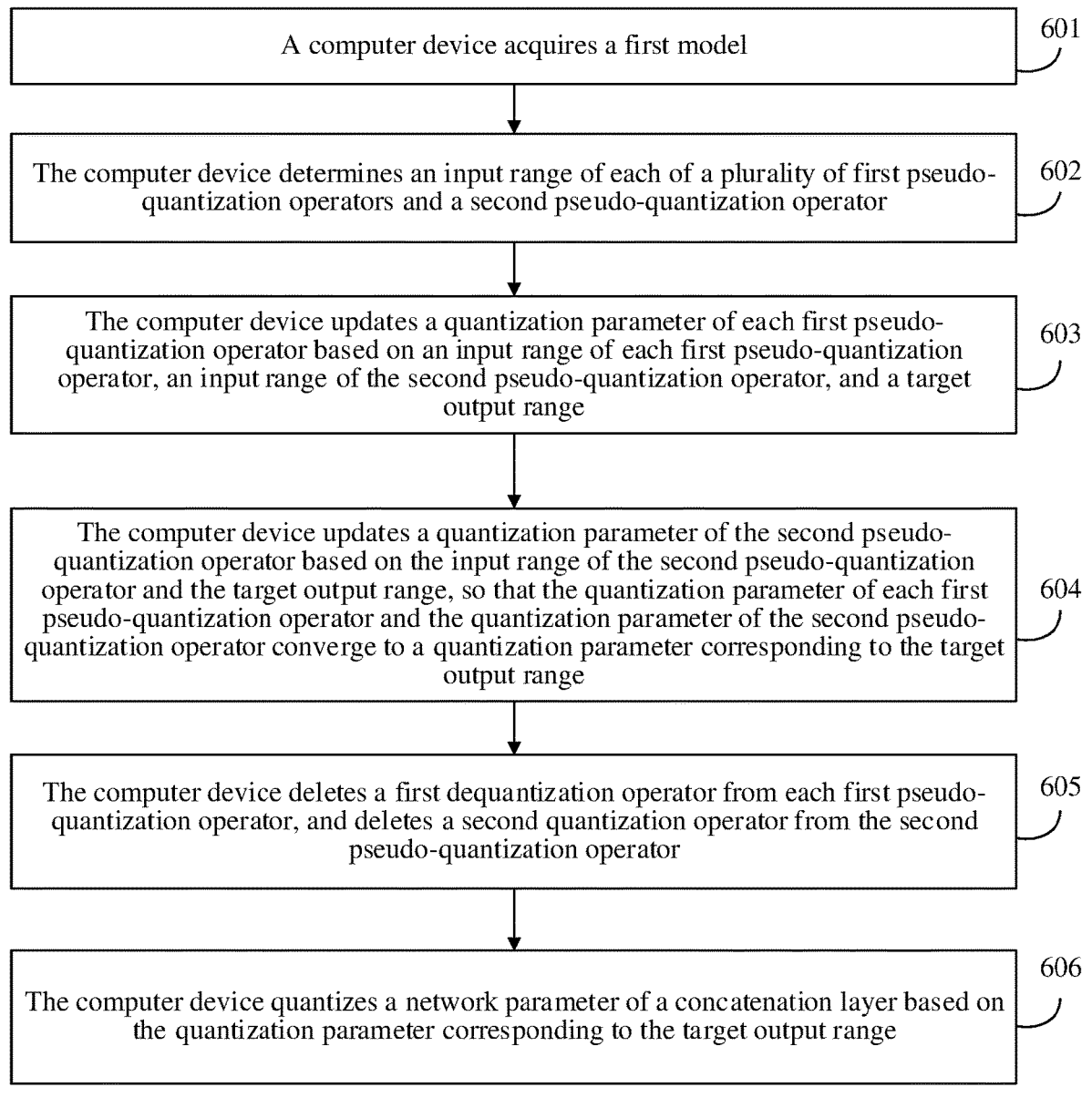

A computer device acquires a first model 601

The computer device determines an input range of each of a plurality of first pseudo-quantization operators and a second pseudo-quantization operator 602

The computer device updates a quantization parameter of each first pseudo-quantization operator based on an input range of each first pseudo-quantization operator, an input range of the second pseudo-quantization operator, and a target output range 603

The computer device updates a quantization parameter of the second pseudo-quantization operator based on the input range of the second pseudo-quantization operator and the target output range, so that the quantization parameter of each first pseudo-quantization operator and the quantization parameter of the second pseudo-quantization operator converge to a quantization parameter corresponding to the target output range 604

The computer device deletes a first dequantization operator from each first pseudo-quantization operator, and deletes a second quantization operator from the second pseudo-quantization operator 605

The computer device quantizes a network parameter of a concatenation layer based on the quantization parameter corresponding to the target output range 606

FIG. 6

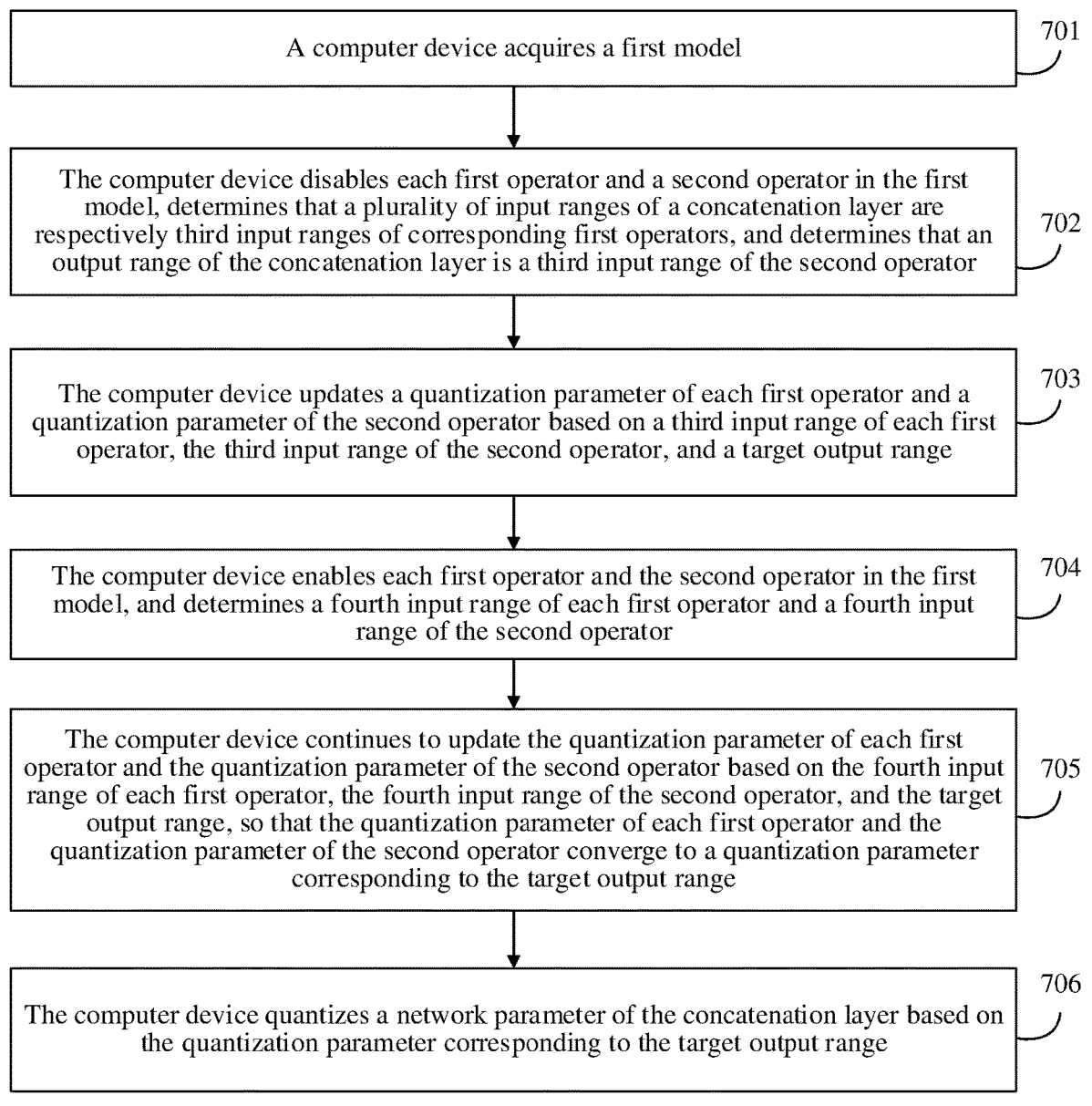

A computer device acquires a first model          701

The computer device disables each first operator and a second operator in the first model, determines that a plurality of input ranges of a concatenation layer are respectively third input ranges of corresponding first operators, and determines that an output range of the concatenation layer is a third input range of the second operator          702

The computer device updates a quantization parameter of each first operator and a quantization parameter of the second operator based on a third input range of each first operator, the third input range of the second operator, and a target output range          703

The computer device enables each first operator and the second operator in the first model, and determines a fourth input range of each first operator and a fourth input range of the second operator          704

The computer device continues to update the quantization parameter of each first operator and the quantization parameter of the second operator based on the fourth input range of each first operator, the fourth input range of the second operator, and the target output range, so that the quantization parameter of each first operator and the quantization parameter of the second operator converge to a quantization parameter corresponding to the target output range          705

The computer device quantizes a network parameter of the concatenation layer based on the quantization parameter corresponding to the target output range          706

FIG. 7

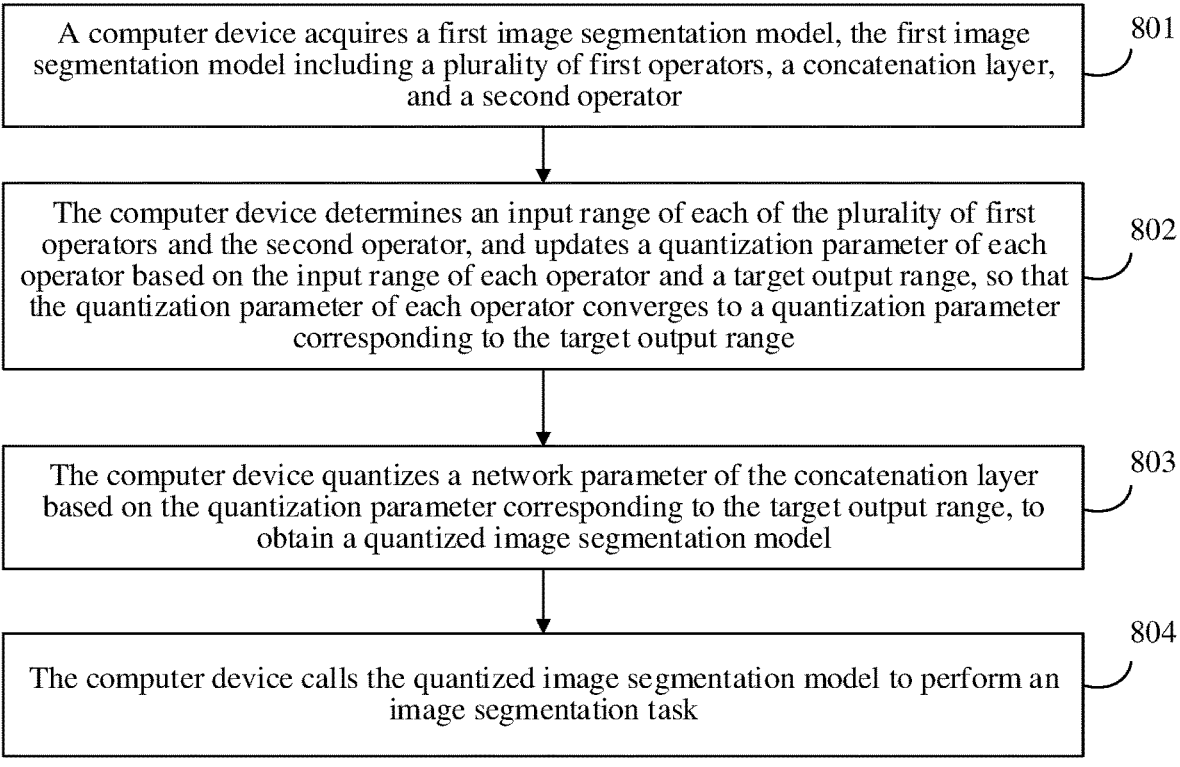

A computer device acquires a first image segmentation model, the first image segmentation model including a plurality of first operators, a concatenation layer, and a second operator — 801

The computer device determines an input range of each of the plurality of first operators and the second operator, and updates a quantization parameter of each operator based on the input range of each operator and a target output range, so that the quantization parameter of each operator converges to a quantization parameter corresponding to the target output range — 802

The computer device quantizes a network parameter of the concatenation layer based on the quantization parameter corresponding to the target output range, to obtain a quantized image segmentation model — 803

The computer device calls the quantized image segmentation model to perform an image segmentation task — 804

FIG. 8

IMAGE SEGMENTATION MODEL QUANTIZATION METHOD AND APPARATUS, COMPUTER DEVICE, AND STORAGE MEDIUM

RELATED APPLICATION

This application is a continuation of International Application No. PCT/CN2022/100106, filed Jun. 21, 2022, which claims priority to Chinese Patent Application No. 202110817137.6, entitled "MODEL QUANTIZATION METHOD AND APPARATUS, COMPUTER DEVICE, AND STORAGE MEDIUM", filed on Jul. 20, 2021. The contents of International Application No. PCT/CN2022/100106 and Chinese Patent Application No. 202110817137.6 are each incorporated by reference in their entirety.

FIELD OF THE TECHNOLOGY

Embodiments of this application relate to the field of computer technologies, and in particular, to an image segmentation model quantization method and apparatus, a computer device, and a storage medium.

BACKGROUND OF THE DISCLOSURE

With continuous development of artificial intelligence technologies, various neural network models are increasingly widely applied. To improve processing efficiency of a neural network model, network parameters at various network layers in the neural network model are usually quantized, so that quantized network layers can directly process integer data.

In the related art, a plurality of pieces of data inputted to a concatenation layer need to be within the same range, and integer data outputted by quantized network layers may have different ranges. Therefore, a network parameter of the concatenation layer is not quantized.

SUMMARY

Embodiments of this application provide an image segmentation model quantization method and apparatus, a computer device, and a storage medium, to improve image segmentation efficiency. The technical solutions are as follows:

According to an aspect, an image segmentation model quantization method is provided. The method includes:

acquiring, by a computer device, a first image segmentation model, the first image segmentation model including a plurality of first operators, a concatenation layer, and a second operator, outputs of the first operators being inputs of the concatenation layer, and an output of the concatenation layer being an input of the second operator;

determining, by the computer device, an input range of each of the plurality of first operators and the second operator, and updating a quantization parameter of each operator based on the input range of each operator and a target output range, so that the quantization parameter of each operator converges to a quantization parameter corresponding to the target output range, the quantization parameter corresponding to the target output range being used for quantizing any data into the target output range;

quantizing, by the computer device, a network parameter of the concatenation layer based on the quantization parameter corresponding to the target output range, to obtain a quantized image segmentation model; and calling the quantized image segmentation model to perform an image segmentation task.

In some embodiments, the updating, by the computer device, a quantization parameter of the second operator based on the input range of the second operator in the round, the input range of the second operator in the previous round, and the target output range includes:

weighting, by the computer device, the input range of the second operator in the round and the input range of the second operator in the previous round, to obtain a second input range of the second operator; and updating, by the computer device, the quantization parameter of the second operator based on the second input range of the second operator and the target output range, so that an updated quantization parameter is capable of quantizing data within the second input range into the target output range.

In some embodiments, the determining, by the computer device, an input range of each of the plurality of first operators and the second operator includes:

acquiring, by the computer device, association information of the concatenation layer, the association information indicating the first operator located before the concatenation layer and a plurality of second operators located after the concatenation layer;

determining, by the computer device, the plurality of first operators and the second operator based on the association information; and determining, by the computer device, input ranges of the plurality of first operators and an input range of the second operator.

In some embodiments, the acquiring, by a computer device, a first image segmentation model includes:

acquiring, by the computer device, a second image segmentation model, the second image segmentation model including a plurality of network layers that are connected sequentially, the plurality of network layers including at least the concatenation layer and a plurality of first network layers, and the first network layers being network layers that are connected to the concatenation layer and that are located before the concatenation layer; and inserting, by the computer device, the first operator between the concatenation layer and each first network layer, and inserting the second operator after the concatenation layer, to obtain the first image segmentation model.

According to another aspect, an image segmentation model quantization apparatus is provided. The apparatus includes:

a model acquisition module, configured to acquire a first image segmentation model, the first image segmentation model including a plurality of first operators, a concatenation layer, and a second operator, outputs of the first operators being inputs of the concatenation layer, and an output of the concatenation layer being an input of the second operator;

a parameter update module, configured to determine an input range of each of the plurality of first operators and the second operator, and update a quantization parameter of each operator based on the input range of each operator and a target output range, so that the quantization parameter of each operator converges to a quantization parameter corresponding to the target output range, the quantization parameter corresponding to the target output range being used for quantizing any data into the target output range;

a quantization module, configured to quantize a network parameter of the concatenation layer based on the quantization parameter corresponding to the target output range, to obtain a quantized image segmentation model; and a segmentation module, configured to call the quantized image segmentation model to perform an image segmentation task.

In some embodiments, the parameter update module includes:

a first parameter update unit, configured to update a quantization parameter of each first operator based on an input range of each first operator, an input range of the second operator, and the target output range; and a second parameter update unit, configured to update a quantization parameter of the second operator based on the input range of the second operator and the target output range, so that the quantization parameter of each first operator and the quantization parameter of the second operator converge to the quantization parameter corresponding to the target output range.

In some embodiments, the parameter update module includes:

a range determining unit, configured to: for each of a plurality of rounds, determine an input range of each operator in the round; and a third parameter update unit, configured to update the quantization parameter of each operator based on the input range of each operator in the round, an input range of each operator in a previous round of the round, and the target output range, so that the quantization parameter of each operator converges to the quantization parameter corresponding to the target output range.

In some embodiments, the range determining unit is configured to call the first image segmentation model to process a plurality of pieces of test data corresponding to the round, to determine the input range of each operator in the round, a plurality of pieces of test data corresponding to each round varying.

In some embodiments, the third parameter update unit is configured to:

update a quantization parameter of each first operator based on an input range of each first operator in the round, an input range of each first operator in the previous round, an input range of the second operator in the round, an input range of the second operator in the previous round, and the target output range; and update a quantization parameter of the second operator based on the input range of the second operator in the round, the input range of the second operator in the previous round, and the target output range, until the quantization parameter of each first operator and the quantization parameter of the second operator converge to the quantization parameter corresponding to the target output range.

In some embodiments, the third parameter update unit is configured to:

weight the input range of each first operator in the round and the input range of each first operator in the previous round, to obtain a first input range of each first operator;

weight the input range of the second operator in the round and the input range of the second operator in the previous round, to obtain a second input range of the second operator; and update the quantization parameter of each first operator based on the first input range of each first operator, the second input range, and the target output range.

In some embodiments, the third parameter update unit is configured to:

determine a first weight parameter corresponding to each first operator, and a second weight parameter corresponding to the second operator, the first weight parameter being negatively correlated with the number of updates of the quantization parameter, and the second weight parameter being positively correlated with the number of updates;

weight the first input range of each first operator and the second input range based on the first weight parameter and the second weight parameter, to obtain a target input range of each first operator; and update the quantization parameter of each first operator based on the target input range of each first operator and the target output range, so that an updated quantization parameter is capable of quantizing data within the target input range into the target output range.

In some embodiments, the third parameter update unit is configured to:

for each first operator, weight, based on a first weight parameter of the first operator and the second weight parameter, a minimum value within a first input range of the first operator and a minimum value within the second input range, to obtain a target minimum value;

weight, based on the first weight parameter and the second weight parameter, a maximum value within the first input range and a maximum value within the second input range, to obtain a target maximum value; and determine that a range between the target minimum value and the target maximum value is a target input range of the first operator.

In some embodiments, the first operator includes a first quantization parameter, and the third parameter update unit is configured to:

for each first operator, determine a first difference between a maximum value and a minimum value within a target input range of the first operator;

determine a second difference between a maximum value and a minimum value within the target output range; and determine that a ratio of the first difference to the second difference is an updated first quantization parameter of the first operator, the first quantization parameter indicating a scaling ratio of data.

In some embodiments, the first operator further includes a second quantization parameter, and the third parameter update unit is configured to:

round a ratio of the minimum value within the target input range to the updated first quantization parameter, to obtain a reference minimum value; and determine that a difference between the minimum value within the target output range and the reference minimum value is an updated second quantization parameter of the first operator, the second quantization parameter indicating a shift magnitude of data.

In some embodiments, the third parameter update unit is configured to:

weight the input range of the second operator in the round and the input range of the second operator in the previous round, to obtain a second input range of the second operator; and update the quantization parameter of the second operator based on the second input range of the second operator and the target output range, so that an updated quantization parameter is capable of quantizing data within the second input range into the target output range.

In some embodiments, the parameter update module includes:

a range determining unit, configured to disable each first operator and the second operator in the first image segmentation model, determine that a plurality of input ranges of the concatenation layer are respectively third input ranges of corresponding first operators, and determine that an output range of the concatenation layer is a third input range of the second operator; and a third parameter update unit, configured to update a quantization parameter of each first operator and a quantization parameter of the second operator based on a third input range of each first operator, the third input range of the second operator, and the target output range, the range determining unit being further configured to enable each first operator and the second operator in the first image segmentation model, and determine a fourth input range of each first operator and a fourth input range of the second operator; and the third parameter update unit being configured to continue to update the quantization parameter of each first operator and the quantization parameter of the second operator based on the fourth input range of each first operator, the fourth input range of the second operator, and the target output range, so that the quantization parameter of each first operator and the quantization parameter of the second operator converge to the quantization parameter corresponding to the target output range.

In some embodiments, the first operator includes a first quantization operator and a first dequantization operator, and the apparatus further includes:

an operator adjustment module, configured to delete the first dequantization operator from each first operator, and delete the second quantization operator from the second operator.

In some embodiments, the parameter update module includes:

a range determining unit, configured to acquire association information of the concatenation layer, the association information indicating the first operator located before the concatenation layer and a plurality of second operators located after the concatenation layer, the range determining unit being configured to determine the plurality of first operators and the second operator based on the association information; and the range determining unit being configured to determine input ranges of the plurality of first operators and an input range of the second operator.

In some embodiments, the model acquisition module includes:

a model acquisition unit, configured to acquire a second image segmentation model, the second image segmentation model including a plurality of network layers that are connected sequentially, the plurality of network layers including at least the concatenation layer and a plurality of first network layers, and the first network layers being network layers that are connected to the concatenation layer and that are located before the concatenation layer; and an operator insertion unit, configured to insert the first operator between the concatenation layer and each first network layer, and insert the second operator after the concatenation layer, to obtain the first image segmentation model.

According to another aspect, a facial recognition model quantization method is provided. The method includes:

acquiring, by a computer device, a first facial recognition model, the first facial recognition model including a plurality of first operators, a concatenation layer, and a second operator, outputs of the first operators being inputs of the concatenation layer, and an output of the concatenation layer being an input of the second operator;

determining, by the computer device, an input range of each of the plurality of first operators and the second operator, and updating a quantization parameter of each operator based on the input range of each operator and a target output range, so that the quantization parameter of each operator converges to a quantization parameter corresponding to the target output range, the quantization parameter corresponding to the target output range being used for quantizing any data into the target output range;

quantizing, by the computer device, a network parameter of the concatenation layer based on the quantization parameter corresponding to the target output range, to obtain a quantized facial recognition model; and calling the quantized facial recognition model to perform a facial recognition task.

According to another aspect, an image classification model quantization method is provided. The method includes:

acquiring, by a computer device, a first image classification model, the first image classification model including a plurality of first operators, a concatenation layer, and a second operator, outputs of the first operators being inputs of the concatenation layer, and an output of the concatenation layer being an input of the second operator;

determining, by the computer device, an input range of each of the plurality of first operators and the second operator, and updating a quantization parameter of each operator based on the input range of each operator and a target output range, so that the quantization parameter of each operator converges to a quantization parameter corresponding to the target output range, the quantization parameter corresponding to the target output range being used for quantizing any data into the target output range;

quantizing, by the computer device, a network parameter of the concatenation layer based on the quantization parameter corresponding to the target output range, to obtain a quantized image classification model; and calling the quantized image classification model to perform an image classification task.

According to another aspect, a computer device is provided, the computer device including a processor and a memory, the memory storing at least one computer program, and the at least one computer program being loaded and executed by the processor to implement the operations performed in the method according to the foregoing aspects.

According to another aspect, a computer-readable storage medium is provided, the computer-readable storage medium storing at least one computer program, and the at least one computer program being loaded and executed by a processor to implement the operations performed in the method according to the foregoing aspects.

According to another aspect, a computer program product or a computer program is provided, the computer program product or the computer program including computer program code, the computer program code being stored in a computer-readable storage medium, a processor of a computer device reading the computer program code from the computer-readable storage medium, and the processor executing the computer program code, so that the computer device implements the operations performed in the method according to the foregoing aspects.

According to the method, apparatus, computer device, and storage medium provided in the embodiments of this application, the quantization parameter of each operator is updated by using the input range of each operator and the target output range, so that the quantization parameter of each operator converges to the quantization parameter corresponding to the target output range. In this way, a consistency constraint is performed on output ranges of a plurality of operators by using the target output range, so that the output ranges of the operators remain the same. This is equivalent to ensuring that a plurality of input ranges and network parameter ranges of the concatenation layer are the same, thereby completing quantization of the concatenation layer. In addition, integer data does not need to be converted into floating-point data, thereby helping improve processing efficiency of an image segmentation model, and therefore improving image segmentation efficiency.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other drawings from these accompanying drawings without creative efforts.

FIG. 1 is a schematic diagram of an implementation environment according to an embodiment of this application.

FIG. 2 is a flowchart of a model quantization method according to an embodiment of this application.

FIG. 3 is a flowchart of a model quantization method according to an embodiment of this application.

FIG. 6 is a flowchart of a model quantization method according to an embodiment of this application.

FIG. 7 is a flowchart of another model quantization method according to an embodiment of this application.

FIG. 8 is a flowchart of an image segmentation model quantization method according to an embodiment of this application.

DESCRIPTION OF EMBODIMENTS

Figures 4, 5:
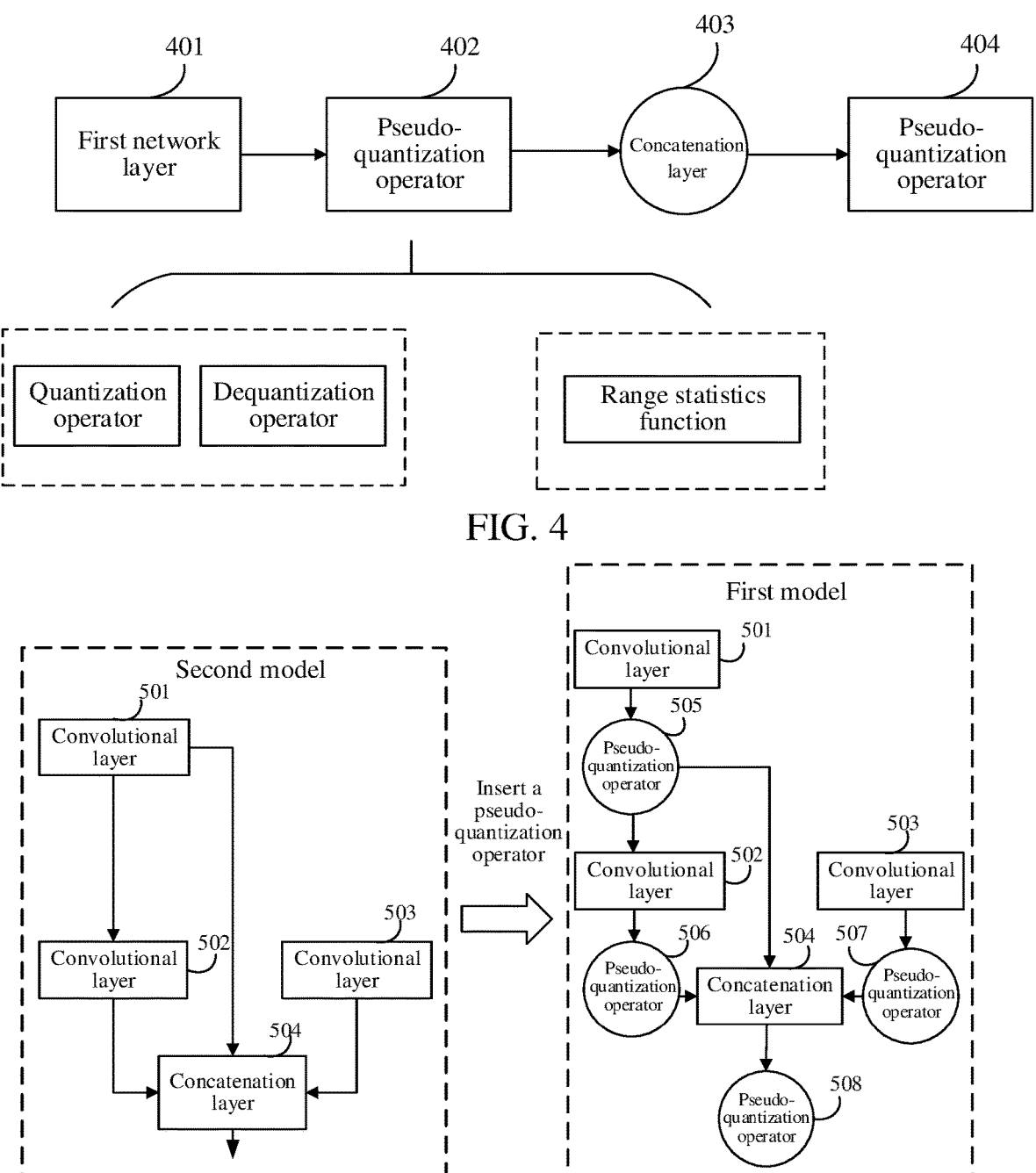
FIG. 4 is a schematic diagram of operator insertion according to an embodiment of this application.
FIG. 5 is another schematic diagram of operator insertion according to an embodiment of this application.

Embodiments of this application provide an image segmentation model quantization method. The method is performed by a computer device. The computer device can quantize a concatenation layer in a model, so that the concatenation layer can directly process data within a same range. In some embodiments, the computer device is a terminal. For example, the terminal is a plurality of types of terminals such as a mobile phone, a desktop computer, a laptop computer, a tablet computer, a smart television, a smart speaker, a vehicle-mounted terminal, a smart robot, or a smart watch. In some embodiments, the computer device is a server. The server is an independent physical server, a server cluster or a distributed system that includes a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In a possible implementation, a computer program included in the embodiments of this application is deployed on one computer device for execution, or is executed on a plurality of computer devices in one location, or is executed on a plurality of computer devices that are distributed in a plurality of locations and that are interconnected through a communications network. The plurality of computer devices that are distributed in a plurality of locations and that are interconnected through a communications network can form a blockchain system.

In a possible implementation, the computer device in the embodiments of this application is a node in a blockchain system. The node can store a quantized model in a blockchain, and then the node or a node corresponding to another device in the blockchain may acquire the quantized model from the blockchain.

In a possible implementation, FIG. 1 is a schematic diagram of an implementation environment according to an embodiment of this application. As shown in FIG. 1, the implementation environment in this embodiment of this application includes a server 101 and a terminal 102, and a communications connection is established between the server 101 and the terminal 102 in a wireless or wired manner. The server 101 trains an image segmentation model, and quantizes a concatenation layer and other network layers in the image segmentation model, to obtain a quantized image segmentation model. The image segmentation model is quantized, so that a size of the model can be reduced, thereby reducing a configuration requirement for a device on which the image segmentation model is deployed. Therefore, the server 101 may transmit the quantized image segmentation model to the terminal 102, and the terminal 102 deploys the quantized image segmentation model, and calls the quantized image segmentation model to perform an image segmentation task to segment any image and obtain a segmentation result.

FIG. 2 is a flowchart of a model quantization method according to an embodiment of this application. This embodiment of this application is performed by a computer device. In some embodiments, the computer device is the terminal or the server in FIG. 1. As shown in FIG. 2, the method includes the following steps:

201: The computer device acquires a first model.

The first model includes a plurality of first operators, a concatenation layer, and a second operator. Outputs of the first operators are inputs of the concatenation layer, and an output of the concatenation layer is an input of the second operator. That is, in the first model, the plurality of first operators are connected before the concatenation layer, and the second operator is connected after the concatenation layer. The concatenation layer is used for concatenating a plurality of pieces of input data.

The first model may include a plurality of types, and different models implement different functions. For example, the first model is a first image segmentation model, and the first image segmentation model is used for performing an image segmentation task; or the first model is a first facial recognition model, and the first facial recognition model is used for performing a facial recognition task; or the first model is a first image classification model, and the first image classification model is used for performing an image classification task.

202: The computer device determines an input range of each of the plurality of first operators and the second operator, and updates a quantization parameter of each operator based on the input range of each operator and a target output range, so that the quantization parameter of each operator converges to a quantization parameter corresponding to the target output range.

An input range of an operator is a value range to which input data of the operator belongs. In this embodiment of this application, the target output range is an expected value range to which output data of an operator belongs. Because an output of a first operator is an input of the concatenation layer, the target output range may alternatively be understood as an expected value range to which input data of the concatenation layer belongs. The quantization parameter corresponding to the target output range is used for quantizing any data into the target output range, that is, data obtained by quantizing any data based on the quantization parameter belongs to the target output range.

In this embodiment of this application, after determining the input range of each operator and the target output range, the computer device updates the quantization parameter of each operator based on the input range of each operator and the target output range, so that the quantization parameter of each operator converges to the quantization parameter corresponding to the target output range. Because the quantization parameter corresponding to the target output range is used for quantizing any data into the target output range, that the quantization parameter of each operator converges to the quantization parameter corresponding to the target output range is equivalent to that the quantization parameter of each operator is updated to make output data obtained by each operator by processing data belong to the target output range, that is, to make a plurality of pieces of input data of the concatenation layer all belong to the target output range.

203: The computer device quantizes a network parameter of the concatenation layer based on the quantization parameter corresponding to the target output range.

After updating the quantization parameter of each operator so that the quantization parameter of each operator converges to the quantization parameter corresponding to the target output range, the computer device quantizes the network parameter of the concatenation layer based on the quantization parameter corresponding to the target output range, that is, quantizes the network parameter of the concatenation layer into the target output range based on the quantization parameter corresponding to the target output range.

In this embodiment of this application, quantizing the concatenation layer means quantizing an input range of the concatenation layer and quantizing the network parameter of the concatenation layer, so that both the input range and the network parameter belong to the target output range. Step 202 can be performed to make a plurality of pieces of input data of the concatenation layer all belong to the target output range, and step 203 can be performed to quantize the network parameter of the concatenation layer into the target output range. Therefore, the input data and the network parameter of the concatenation layer both belong to the target output range, thereby implementing quantization of the concatenation layer.

Model quantization is a technology for converting floating-point computation into fixed-point computation on least significant bits, so that model computation intensity, a parameter size, and memory consumption can be effectively reduced. Actually, the model quantization is to quantize floating-point data into integer data represented by using n bits, where n is any positive integer. Regardless of whether values of the n bits are 0 or 1, the obtained integer data is an exponential power of 2, so that the floating-point data can be quantized into an exponential power of 2. For example, n is 8, and the first bit of the n bits indicates whether the integer data is positive or negative. In this case, a minimum value within the target output range is a negative number of the 7th power of 2, and a maximum value is the 7th power of 2 minus 1. Therefore, the target output range is [−128, 127], indicating that data to be obtained by quantizing the input range and the network parameter of the concatenation layer is 8-bit integer data. In this case, the first model may also be referred to as an 8-bit quantization model.

After the first model is quantized, a quantized model may be called to perform a corresponding task. Different types of models perform different tasks. For example, where the first model is the first image segmentation model, the computer device calls a quantized image segmentation model to perform an image segmentation task. As another example, where the first model is the first facial recognition model, the computer device calls a quantized facial recognition model to perform a facial recognition task. As still another example, where the first model is the first image classification model, the computer device calls a quantized image classification model to perform an image classification task.

In the related art, a network parameter of a concatenation layer cannot be quantized. However, in the method provided in this embodiment of this application, the quantization parameter of each operator is updated based on the input range of each operator and the target output range, so that the quantization parameter of each operator converges to the quantization parameter corresponding to the target output range. In this way, a consistency constraint is performed on output ranges of a plurality of operators by using the target output range, so that the output ranges of the operators remain the same. In addition, the network parameter of the concatenation layer is quantized into the target output range, thereby ensuring that a plurality of input ranges and network parameter ranges of the concatenation layer are the same, and completing quantization of the concatenation layer. In the quantized first model, a plurality of pieces of input data of the concatenation layer all belong to the target output range, and the concatenation layer can directly concatenate input data that belongs to a same range. Therefore, the plurality of pieces of input data do not need to be converted into floating-point data first, thereby simplifying an operation process and helping improve processing efficiency of the model.

FIG. 3 is a flowchart of a model quantization method according to an embodiment of this application. This embodiment of this application is performed by a computer device. Optionally, the computer device is the terminal or the server in FIG. 1. As shown in FIG. 3, the method includes the following steps:

301: The computer device acquires a first model.

The first model includes a plurality of first operators, a concatenation layer, and a second operator, outputs of the first operators are inputs of the concatenation layer, and an output of the concatenation layer is an input of the second operator. The concatenation layer is used for concatenating a plurality of pieces of input data In some embodiments, the concatenation layer is a concatenation operator. The first model is any type of neural network model, and it needs to be ensured that the first model includes a concatenation layer. For example, the first model is a speech recognition model, an image segmentation model, an image classification model, or a facial recognition model. This is not limited in this embodiment of this application.

In an implementation, the computer device acquires a second model, the second model including a plurality of network layers that are connected sequentially, the plurality of network layers including at least a concatenation layer and a plurality of first network layers, and the first network layers being network layers that are separately connected to the concatenation layer and that are located before the concatenation layer. The computer device inserts the first operator between the concatenation layer and each first network layer, and inserts the second operator after the concatenation layer, to obtain the first model. The first network layer is any type of network layer, for example, a convolutional layer or a pooling layer.

After the computer device adds a corresponding first operator for the concatenation layer, input data (namely, output data of the first network layer) that originally can be directly inputted to the concatenation layer can be inputted to the concatenation layer only after being processed by a first operator. After the computer device adds a corresponding second operator for the concatenation layer, subsequent processing that originally can be directly performed on output data of the concatenation layer can be performed only after the output data of the concatenation layer is processed by the second operator.

For example, the first operator and the second operator are pseudo-quantization operators. FIG. 4 is a schematic diagram of operator insertion according to an embodiment of this application. As shown in FIG. 4, a pseudo-quantization operator 402 is inserted between a first network layer 401 and a concatenation layer 403, and a pseudo-quantization operator 404 is inserted after the concatenation layer. Each pseudo-quantization operator includes a quantization operator and a dequantization operator. The quantization operator is used for quantization and the dequantization operator is used for dequantization. Each pseudo-quantization operator further has a corresponding range statistics function. The range statistics function of the pseudo-quantization operator is used for determining an input range of the pseudo-quantization operator.

FIG. 5 is another schematic diagram of operator insertion according to an embodiment of this application. As shown in FIG. 5, the second model includes a convolutional layer 501, a convolutional layer 502, a convolutional layer 503, and a concatenation layer 504, where the concatenation layer 504 is separately connected to the convolutional layer 501, the convolutional layer 502, and the convolutional layer 503. In this case, the computer device inserts a pseudo-quantization operator 505 between the convolutional layer 501 and the concatenation layer 504, inserts a pseudo-quantization operator 506 between the convolutional layer 502 and the concatenation layer 504, inserts a pseudo-quantization operator 507 between the convolutional layer 503 and the concatenation layer 504, and connects a pseudo-quantization operator 508 after the concatenation layer 504, to obtain the first model. The pseudo-quantization operator 505, the pseudo-quantization operator 506, and the pseudo-quantization operator 507 are the first operators shown in this embodiment of this application, and the pseudo-quantization operator 508 is the second operator shown in this embodiment of this application.

302: For each of a plurality of rounds, the computer device determines an input range of each of the plurality of first operators and the second operator.

In this embodiment of this application, the computer device performs a plurality of rounds to update a quantization parameter of an operator, and for each of the plurality of rounds, the computer device determines an input range of each of the plurality of first operators and the second operator. An input range of an operator is a value range to which input data of the operator belongs. A quantization parameter of an operator is a parameter for mapping data inputted to the operator to a specific output range. The input data of the operator is processed based on the quantization parameter of the operator, so that output data obtained through processing belongs to an output range corresponding to the quantization parameter.

In a possible implementation, the computer device calls the first model to process a plurality of pieces of test data corresponding to the round, so as to determine the input range of each of the plurality of first operators and the second operator in the round. A plurality of pieces of test data corresponding to each round vary. A type of the plurality of pieces of test data is related to a type of the first model. For example, where the first model is an image segmentation model, the plurality of pieces of test data are a plurality of images.

The computer device acquires the plurality of pieces of test data corresponding to the round, and calls the first model to separately process the plurality of pieces of test data. For each of the plurality of first operators and the second operator, another network layer is connected before the operator, and during processing performed by the first model on specific test data, data outputted by the another network layer is inputted to the operator. In this case, during processing separately performed by the first model on the plurality of pieces of test data, a plurality of pieces of data are separately inputted to the operator. The computer device collects statistics on values of the plurality of pieces of data inputted to the operator, and determines an input range of the operator based on the values of the plurality of pieces of data. For example, the computer device determines that a range between a minimum value of the plurality of pieces of data and a maximum value of the plurality of pieces of data is the input range of the operator.

In another possible implementation, the computer device acquires association information of the concatenation layer, the association information indicating the first operator located before the concatenation layer and a plurality of second operators located after the concatenation layer; and determines the plurality of first operators and the second operator based on the association information. Then the computer device determines input ranges of the plurality of first operators and an input range of the second operator.

For ease of determining operators connected to the concatenation layer, during insertion of a first operator and a second operator corresponding to the concatenation layer, the computer device acquires the association information of the concatenation layer, the association information indicating the first operator located before the concatenation layer and the plurality of second operators located after the concatenation layer. Therefore, the computer device can determine, by querying the association information of the concatenation layer, the plurality of first operators located before the concatenation layer and the plurality of second operators located after the concatenation layer, so as to determine the input ranges of the plurality of first operators and the input range of the second operator.

The computer device calls the first model to process the plurality of pieces of test data to determine the input range of each operator in the first model, and stores the input range of each operator. Then, after querying, based on the association information, the first operators and the second operator that are connected to the concatenation layer, the computer device may acquire an input range of each first operator and an input range of the second operator from determined input ranges of a plurality of operators.

In some embodiments, the association information includes an operator identifier and a plurality of operator pointers, the operator identifier indicates the second operator located after the concatenation layer, and the operator pointers indicate the first operators located before the concatenation layer. Therefore, the computer device can determine the second operator based on the operator identifier, and determine the plurality of first operators based on the operator pointers.

303: The computer device updates a quantization parameter of each first operator based on an input range of each first operator in the round, an input range of each first operator in a previous round, an input range of the second operator in the round, an input range of the second operator in the previous round, and a target output range.

In addition to determining the input range of each operator in the round, the computer device further acquires the input range of each operator in the previous round of the round, and updates the quantization parameter of each first operator based on the input range of each first operator in the round, the input range of each first operator in the previous round, the input range of the second operator in the round, the input range of the second operator in the previous round, and the target output range.

Because test data used in each round varies, an input range determined in each round also varies. In each round, the computer device updates the quantization parameter of the first operator with reference to an input range in the round and an input range in a previous round. This is equivalent to considering test data in two rounds. That is, an amount of information referenced during the update of the quantization parameter of the first operator is increased, thereby helping improve accuracy of updating the quantization parameter and increase a convergence speed of the quantization parameter.

In addition, updating the quantization parameter of the first operator based on the input range of each first operator, the input range of the second operator, and the target output range is equivalent to broadcasting the input range of the second operator to each first operator, so that the quantization parameter of the first operator is constrained by using the input range of the second operator. In this way, the quantization parameter of each first operator and a quantization parameter of the second operator converge to a same value as soon as possible, thereby further increasing a convergence speed of the quantization parameters.

The target output range is an expected value range to which output data of an operator belongs. Because an output of a first operator is an input of the concatenation layer, the target output range may alternatively be understood as an expected value range to which input data of the concatenation layer belongs. The target output range is also referred to as a quantization range. In some embodiments, the target output range is preset by the computer device or is provided by a developer for the computer device. This is not limited in this embodiment of this application. In some embodiments, the target output range is determined based on a preset value n, which indicates to quantize floating-point data into integer data represented by using n bits, where n is any positive integer. Regardless of whether values of the n bits are 0 or 1, the obtained integer data is an exponential power of 2, so that the floating-point data can be quantized into an exponential power of 2.

In a possible implementation, output data of an operator is integer data, and the integer data is stored in a binary mode. The computer device determines storage space of the integer data, and determines the target output range based on the storage space of the integer data. In some embodiments, the computer device determines a minimum value that can be stored in the storage space and a maximum value that can be stored in the storage space, and determines that a range between the minimum value and the maximum value is the target output range. For example, in a case that n is 8, the 8-bit storage space is used for storing values in 8 bits. Therefore, in the 8-bit storage space, a minimum value that can be stored is $-128$, and a maximum value that can be stored is 127. Therefore, the target output range is $[-128, 127]$. Optionally, the size n of the storage space is preset by the computer device or is provided by a developer for the computer device. This is not limited in this embodiment of this application.

In a possible implementation, the computer device weights the input range of each first operator in the round and the input range of each first operator in the previous round, to obtain a first input range of each first operator; and weights the input range of the second operator in the round and the input range of the second operator in the previous round, to obtain a second input range of the second operator. Therefore, the first input range includes information about the input range of the first operator in the round and the input range of the first operator in the previous round, and the second input range includes information about the input range of the second operator in the round and the input range of the second operator in the previous round. In this case, the computer device updates the quantization parameter of each first operator based on the first input range of each first operator, the second input range of the second operator, and target output range, thereby increasing an amount of information referenced during the update of the quantization parameter of the first operator.

For example, the computer device weights a minimum value within the input range of each first operator in the round and a minimum value within the input range of each first operator in the previous round, to obtain a weighted minimum value; weights a maximum value within the input range of each first operator in the round and a maximum value within the input range of each first operator in the previous round, to obtain a weighted maximum value; and determines that a range between the weighted minimum value and the weighted maximum value is the first input range. A manner of determining the second input range is similar to the manner of determining the first input range.

For example, the computer device weights the input range of each first operator in the round and the input range of each first operator in the previous round by using a third weight parameter corresponding to the round and a fourth weight parameter corresponding to the previous round respectively, to obtain the first input range of each first operator; and the computer device weights the input range of the second operator in the round and the input range of the second operator in the previous round by using the third weight parameter corresponding to the round and the fourth weight parameter corresponding to the previous round, to obtain the second input range of the second operator. In some embodiments, a sum of the third weight parameter and the fourth weight parameter is 1, and the third weight parameter and the fourth weight parameter are both values between 0 and 1. For example, the third weight parameter and the fourth weight parameter are both 0.5.

In another possible implementation, that the computer device updates a quantization parameter of each first operator includes: determining a first weight parameter corresponding to each first operator, and a second weight parameter corresponding to the second operator; weighting the first input range of each first operator and the second input range based on each first weight parameter and the second weight parameter, to obtain a target input range of each first operator; and updating the quantization parameter of each first operator based on the target input range of each first operator and the target output range, so that an updated quantization parameter is capable of quantizing data within the target input range into the target output range.

The first weight parameter is negatively correlated with the number of updates of the quantization parameter, and the second weight parameter is positively correlated with the number of updates of the quantization parameter. A smaller number of updates of the quantization parameter indicates a larger first weight parameter and a smaller second weight parameter. A larger number of updates of the quantization parameter indicates a smaller first weight parameter and a larger second weight parameter. In some embodiments, a sum of the first weight parameter and the second weight parameter is 1, and the first weight parameter and the second weight parameter are both values between 0 and 1. For example, during the first update of the quantization parameter, the first weight parameter is 1, and the second weight parameter is 0; and during the last update of the quantization parameter, the first weight parameter is 0, and the second weight parameter is 1. To be specific, in an initial update of the quantization parameter, during determining of the target input range, the first input range of the first operator accounts for a larger proportion, and the second input range of the second operator accounts for a smaller proportion. With continuous updates of the quantization parameter, the proportion of the first input range of the first operator is gradually reduced, and the proportion of the second input range of the second operator is gradually increased, so that the quantization parameter of the first operator and the quantization parameter of the second operator gradually converge to a same value under a constraint of the second input range of the second operator.

In another possible implementation, that the computer device obtains a target input range of each first operator includes: for each first operator, weighting, based on a first weight parameter of the first operator and the second weight parameter, a minimum value within a first input range of the first operator and a minimum value within the second input range, to obtain a target minimum value; weighting, based on the first weight parameter and the second weight parameter, a maximum value within the first input range and a maximum value within the second input range, to obtain a target maximum value; and determining that a range between the target minimum value and the target maximum value is a target input range of the first operator.

For example, the computer device determines the target minimum value and the target maximum value by using the following formula:

$$(x\_min\_1) = \alpha \times x\_min\_4 + (1-\alpha) \times x\_min\_1; \text{and}$$

$$(x\_max\_1) = \alpha \times x\_max\_4 + (1-\alpha) \times x\_max\_1, \text{where}$$

(xmin_1) indicates the target minimum value corresponding to the first operator, $x\_min\_4$ indicates the minimum value within the second input range of the second operator, and $x\_min\_1$ indicates the minimum value within the first input range of the first operator. (xmax_1) indicates the target maximum value corresponding to the first operator, $x\_max\_4$ indicates the maximum value within the second input range of the second operator, and $x\_max\_1$ indicates the maximum value within the first input range of the first operator. $\alpha$ indicates the second weight parameter, $1-\alpha$ indicates the first weight parameter, $\alpha$ increases as the number of updates of the quantization parameter increases, a minimum value of $\alpha$ is 0, and a maximum value of $\alpha$ is 1.

In another possible implementation, the first operator includes a first quantization parameter, and that the computer device updates a quantization parameter of each first operator includes: for each first operator, determining a first difference between a maximum value and a minimum value within a target input range of the first operator; determining a second difference between a maximum value and a minimum value within the target output range; and determining that a ratio of the first difference to the second difference is an updated first quantization parameter of the first operator.

The first quantization parameter indicates a scaling ratio of data. In this embodiment of this application, the first operator includes a quantization operator and a dequantization operator. The first operator is capable of quantizing and dequantizing any data. The quantizing any data includes scaling down the data to map the data from one value range to another value range. The dequantizing any data includes scaling up a quantized data to map the quantized data from the another value range back to the value range. The first quantization parameter is a ratio for scaling down or scaling up data.

For example, the computer device determines the first quantization parameter by using the following formula:

$$scale = ((max\_val - min\_val))/(q\_max - q\_min), \text{where}$$

scale indicates the first quantization parameter, max_val indicates the maximum value within the target input range, min_val indicates the minimum value within the target input range, qmax indicates the maximum value within the target output range, and qmin indicates the minimum value within the target output range.

In some embodiments, the first operator further includes a second quantization parameter, and that the computer device updates a quantization parameter of each first operator includes: rounding a ratio of the minimum value within the target input range to the updated first quantization parameter, to obtain a reference minimum value; and determining that a difference between the minimum value within the target output range and the reference minimum value is an updated second quantization parameter of the first operator.

The second quantization parameter indicates a shift magnitude of data. In this embodiment of this application, the quantizing and dequantizing any data further includes shifting any data to map the data from one value range to another value range, that is, shifting the data from one value range to another value range. The second quantization parameter is a magnitude for shifting data. The shifting any data means adding the second quantization parameter to the data or subtracting the second quantization parameter from the data, to change a value range to which the data belongs. Certainly, the data may alternatively be shifted based on the second quantization parameter in a manner other than addition or subtraction.

For example, the computer device determines the second quantization parameter by using the following formula:

$$\text{zero\_point} = q \min - \text{round}((\min\_val)/\text{scale}), \text{ where}$$

zero_point indicates the second quantization parameter, qmin indicates the minimum value within the target output range, min_val indicates the minimum value within the target input range, scale indicates the first quantization parameter, and round( ) indicates a rounding function.

The first quantization parameter and the second quantization parameter are capable of quantizing data within the target input range into the target output range. In a possible implementation, the first operator and the second operator are pseudo-quantization operators, a pseudo-quantization operator includes a quantization operator and a dequantization operator, and the first quantization parameter and the second quantization parameter are parameters of a quantization operator and a dequantization operator. An expression formula of the quantization operator is as follows:

$$X\_Q = \text{clamp}(\text{round}(X\_F/\text{scale}) + \text{zero\_point}, q \min, q \max), \text{ where}$$

X_F indicates input data of the quantization operator, X_Q indicates output data of the quantization operator, scale indicates the first quantization parameter, round(·) indicates a rounding function, zero_point indicates the second quantization parameter, qmin indicates the minimum value within the target output range, qmax indicates the maximum value within the target output range, and clamp(·) indicates a range limiting function used for limiting X_Q between qmin and qmax. Optionally, X_F is floating-point data, and X_Q is integer data.

An expression formula of the dequantization operator is as follows:

$$X\_F1 = (X\_Q - \text{zero\_point}) \times \text{scale}, \text{ where}$$

X_Q indicates input data of the dequantization operator, X_F1 indicates output data of the dequantization operator, there is an error caused by quantization between X_F1 and X_F, scale indicates the first quantization parameter, and zero_point indicates the second quantization parameter.

304: The computer device updates a quantization parameter of the second operator based on the input range of the second operator in the round, the input range of the second operator in the previous round, and the target output range, until the quantization parameter of each first operator and the quantization parameter of the second operator converge to the quantization parameter corresponding to the target output range.

In addition to determining the input range of each operator in the round, the computer device further acquires the input range of each operator in the previous round of the round, and updates the quantization parameter of the second operator based on the input range of the second operator in the round, the input range of the second operator in the previous round, and the target output range.

In step 302 to step 304, a process of updating the quantization parameter of the first operator and the quantization parameter of the second operator is described only by using one round as an example. However, in this embodiment of this application, the quantization parameter of each operator is updated for a plurality of times through a plurality of rounds, until the quantization parameter of each first operator and the quantization parameter of the second operator converge to the quantization parameter corresponding to the target output range. The quantization parameter corresponding to the target output range is used for quantizing any data into the target output range.

In a possible implementation, that the computer device updates a quantization parameter of the second operator includes: weighting the input range of the second operator in the round and the input range of the second operator in the previous round, to obtain a second input range of the second operator; and updating the quantization parameter of the second operator based on the second input range of the second operator and the target output range, so that an updated quantization parameter is capable of quantizing data within the second input range into the target output range.

A process of updating, by the computer device, the quantization parameter of the second operator based on the second input range and the target output range is similar to the process of updating the quantization parameter of the first operator based on the target input range and target output range in step 303. Details are not described herein again.

By performing step 303 and step 304, the computer device updates the quantization parameter of each operator based on the input range of each operator in the round, the input range of each operator in the previous round of the round, and the target output range, so that the quantization parameter of each operator converges to the quantization parameter corresponding to the target output range. In addition, the computer device may alternatively update the quantization parameters in a manner different from that in step 303 and step 304. For example, the computer device determines a target first operator from the plurality of first operators, and constrains a quantization parameter of another first operator and the quantization parameter of the second operator based on an input range of the target first operator, so that the quantization parameter of the another first operator and the quantization parameter of the second operator converge to a quantization parameter corresponding to the input range of the target first operator.

305: The computer device quantizes a network parameter of the concatenation layer based on the quantization parameter corresponding to the target output range.

The computer device quantizes the network parameter of the concatenation layer into the target output range based on the quantization parameter corresponding to the target output range.

In a possible implementation, the quantization parameter includes the first quantization parameter and the second quantization parameter described in step 303. A formula for quantizing, by the computer device, the network parameter of the concatenation layer is as follows:

$$X\_L=\text{clamp}(\text{round}(X\_C/\text{scale})+\text{zero\_point}, q\min, q\max), \text{ where}$$

X_C indicates the network parameter of the concatenation layer, X_L indicates a quantized network parameter, scale indicates the first quantization parameter, round(·) indicates a rounding function, zero_point indicates the second quantization parameter, qmin indicates the minimum value within the target output range, qmax indicates the maximum value within the target output range, and clamp( ) indicates a range limiting function used for limiting X_L between qmin and qmax.

Step 301 to step 305 can be performed to make a plurality of pieces of input data of the concatenation layer all belong to the target output range, and step 306 can be performed to further quantize the network parameter of the concatenation layer into the target output range. Therefore, the input data and the network parameter processed at the concatenation layer are both within the target output range, thereby implementing quantization of the concatenation layer.

In another embodiment, the first operator and the second operator are both pseudo-quantization operators, the first operator includes a first quantization operator and a first dequantization operator, the second operator includes a second quantization operator and a second dequantization operator, and the updated quantization parameter of the first operator and the updated quantization parameter of the second operator are both the quantization parameter corresponding to the target output range. After performing step 304, the computer device deletes the first dequantization operator from each first operator, deletes the second quantization operator from the second operator, and retains the first quantization operator in the first operator and the second dequantization operator in the second operator.

An updated quantization parameter of the first quantization operator is capable of quantizing input data into the target output range, and output data of the first quantization operator is input data of the concatenation layer. Therefore, a plurality of pieces of input data of the concatenation layer all belong to the target output range. The concatenation layer concatenates quantized data. Therefore, after the concatenation layer concatenates data, the second dequantization operator dequantizes the quantized data, so that a subsequent network layer can process dequantized data, thereby reducing an error caused by quantization.

The computer device quantizes the network parameter of the concatenation layer to obtain a quantized first model, and the computer device subsequently calls the quantized first model to process data. In the quantized first model, a plurality of pieces of input data of the concatenation layer all belong to the target output range, and the concatenation layer can directly concatenate input data that belongs to a same range. Therefore, the plurality of pieces of input data do not need to be converted into floating-point data first, thereby simplifying an operation process and helping improve processing efficiency of the model.

The quantized first model may be any type of model, and different types of first models can perform different tasks.

In some embodiments, the first model is a first image segmentation model, and the quantized first model is a quantized image segmentation model. The quantized image segmentation model is used for cutting a target area from an image. The target area is a character area, a face area, or an area in which an environment element is located. The environment element is an element that is included in the image and that is capable of describing an environment in which the image is captured, for example, an element such as sky, clouds, earth, or rain.

In a possible implementation, the computer device captures, by using a camera, an original image including a character, and calls the quantized image segmentation model to segment the original image, to obtain a target image including a character area; or the computer device captures, by using a camera, an original image including a face, and calls the quantized image segmentation model to segment the original image, to obtain a target image including a face area; or the computer device captures, by using a camera, an environment image including an environment element, and calls the quantized image segmentation model to segment the original image, to obtain a target image including the environment element.

For example, the environment element is sky. The computer device captures a sky image including sky, and calls the quantized image segmentation model to segment the sky image, to obtain a sky area in the sky image.

In some other embodiments, the first model is a facial recognition model, and the quantized first model is a quantized facial recognition model. The facial recognition model is used for recognizing whether a face in an image is a target face. The computer device acquires a face image, and calls the facial recognition model to perform facial recognition on the face image, to obtain a facial recognition result, the facial recognition result indicating whether a face in the face image is a target face.

In some other embodiments, the first model is a first image classification model, and the quantized first model is a quantized image classification model. The image classification model is used for classifying an image to determine a category to which the image belongs. There are a plurality of image categories. For example, the image categories include a landscape image and a character image, and the quantified image classification model is used for classifying a landscape image and a character image. The computer device acquires a to-be-detected image from an image library, and calls the image classification model to classify the to-be-detected image to obtain a classification result, where the classification result indicates whether the to-be-detected image is a landscape image or a character image.

According to the method provided in this embodiment of this application, the quantization parameter of each operator is updated by using the input range of each operator and the target output range, so that the quantization parameter of each operator converges to the quantization parameter corresponding to the target output range. In this way, a consistency constraint is performed on output ranges of a plurality of operators by using the target output range, so that the output ranges of the operators remain the same. This is equivalent to ensuring that a plurality of input ranges and network parameter ranges of the concatenation layer are the same, thereby completing quantization of the concatenation layer.

In addition, because test data used in each round varies, an input range determined in each round also varies. In each round, the computer device updates a quantization parameter of an operator with reference to an input range in the round and an input range in a previous round. This is equivalent to considering test data in two rounds, that is, an amount of information referenced during the update of the quantization parameter of the operator is increased, thereby helping improve accuracy of updating the quantization parameter and increase a convergence speed of the quantization parameter.

In addition, updating the quantization parameter of the first operator based on the input range of the first operator, the input range of the second operator, and the target output range is equivalent to broadcasting the input range of the second operator to each first operator, so that the quantization parameter of the first operator is constrained by using the input range of the second operator. In this way, the quantization parameter of the first operator and a quantization parameter of the second operator converge to a same value as soon as possible, thereby further increasing a convergence speed of the quantization parameters.

In addition, with continuous updates of the quantization parameters, during determining of the target input range, a proportion of the first input range of the first operator is gradually reduced, and a proportion of the second input range of the second operator is gradually increased, so that the quantization parameter of the first operator and the quantization parameter of the second operator gradually converge to a same value under a constraint of the input range of the second operator.

The embodiment of FIG. 3 describes the quantization of the concatenation layer of the first model through a plurality of rounds of updates of the quantization parameters. In addition, the computer device may alternatively perform only one update of the quantization parameters to quantize the concatenation layer of the first model, and therefore no reference needs to be made to an input range in another round. For example, the computer device uses, in one update of the quantization parameters, all test data used in a plurality of rounds in the embodiment of FIG. 3, to complete quantization FIG. 6 is a flowchart of a model quantization method according to an embodiment of this application. In this embodiment of this application, an example in which a first operator is a first pseudo-quantization operator and a second operator is a second pseudo-quantization operator is used for description. This embodiment of this application is performed by a computer device, and the method includes the following steps:

601: The computer device acquires a first model.

602: The computer device determines an input range of each of a plurality of first pseudo-quantization operators and a second pseudo-quantization operator.

A process of step 601 and step 602 is similar to that of step 301 and step 302. Details are not described herein again.

603: The computer device updates a quantization parameter of each first pseudo-quantization operator based on an input range of each first pseudo-quantization operator, an input range of the second pseudo-quantization operator, and a target output range.

The computer device constrains the quantization parameter of the first pseudo-quantization operator by using the input range of the second pseudo-quantization operator, so that the quantization parameter of the first pseudo-quantization operator and a quantization parameter of the second pseudo-quantization operator converge to a same value.

In a possible implementation, a first weight parameter corresponding to each first pseudo-quantization operator, and a second weight parameter corresponding to the second pseudo-quantization operator are determined. The input range of each first pseudo-quantization operator and the input range of the second pseudo-quantization operator are weighted based on the first weight parameter and the second weight parameter, to obtain a target input range of each first pseudo-quantization operator. The quantization parameter of each first pseudo-quantization operator is updated based on the target input range of each first pseudo-quantization operator and the target output range, so that an updated quantization parameter is capable of quantizing data within the target input range into the target output range. A process of determining the target input range based on the input range of the first pseudo-quantization operator and the input range of the second pseudo-quantization operator is the same as the process of determining the target input range based on the first input range and the second input range in step 303. Details are not described herein again. A process of updating the quantization parameter based on the target input range and the target output range is similar to the process of updating the quantization parameter based on the target input range and the target output range in step 303. Details are not described herein again.

604: The computer device updates a quantization parameter of the second pseudo-quantization operator based on the input range of the second pseudo-quantization operator and the target output range, so that the quantization parameter of each first pseudo-quantization operator and the quantization parameter of the second pseudo-quantization operator converge to a quantization parameter corresponding to the target output range.

A process of updating the quantization parameter of the second pseudo-quantization operator based on the input range of the second pseudo-quantization operator and the target output range in step 604 is similar to the process of updating the quantization parameters of the second pseudo-quantization operator based on the second input range and the target output range in step 304. Details are not described herein again.

By performing step 603 and step 604, the computer device updates a quantization parameter of each operator based on an input range of each operator and the target output range, so that the quantization parameter of each operator converges to the quantization parameter corresponding to the target output range. In addition, the computer device may alternatively update the quantization parameters in a manner different from that in step 603 and step 604. For example, the computer device determines a target first pseudo-quantization operator from the plurality of first pseudo-quantization operators, and constrains a quantization parameter of another first pseudo-quantization operator and the quantization parameter of the second pseudo-quantization operator based on an input range of the target first operator.

605: The computer device deletes a first dequantization operator from each first pseudo-quantization operator, and deletes a second quantization operator from the second pseudo-quantization operator.

606: The computer device quantizes a network parameter of a concatenation layer based on the quantization parameter corresponding to the target output range.

A process of step 605 and step 606 is similar to that of step 305. Details are not described herein again.

According to the method provided in this embodiment of this application, the quantization parameter of each operator is updated by using the input range of each operator and the target output range, so that the quantization parameter of each operator converges to the quantization parameter corresponding to the target output range. In this way, a consistency constraint is performed on output ranges of a plurality of operators by using the target output range, so that the output ranges of the operators remain the same. This is equivalent to ensuring that a plurality of input ranges and network parameter ranges of the concatenation layer are the same, thereby completing quantization of the concatenation layer.

In the embodiments of FIG. 3 and FIG. 6, the quantization parameter of the first operator and the quantization parameter of the second operator are updated when the first operator and the second operator in the first model are enabled. In another embodiment, to ensure accuracy of a determined input range, the first operator and the second operator may be disabled first, and an update operation is performed; and then the first operator and the second operator are enabled, and an update operation is performed, as shown in FIG. 7. FIG. 7 is a flowchart of a model quantization method according to an embodiment of this application. This embodiment of this application is performed by a computer device, and the method includes the following steps:

701: The computer device acquires a first model.

A process of step 701 is similar to that of step 301. Details are not described herein again.

702: The computer device disables each first operator and a second operator in the first model, determines that a plurality of input ranges of a concatenation layer are respectively third input ranges of corresponding first operators, and determines that an output range of the concatenation layer is a third input range of the second operator.

The computer device disables each first operator and the second operator in the first model. When the computer device calls the first model to process data, output data of a network layer located before the first operator is directly processed by the concatenation layer, the first operator does not process the output data of the network layer located before the first operator, and the second operator does not process output data of the concatenation layer either. Instead, a network layer located after the second operator continues to process the output data of the concatenation layer. For example, in the first model shown in FIG. 5, after each first operator and the second operator is disabled, that is, after each pseudo-quantization operator is disabled, output data of the convolutional layer 501, the convolutional layer 502 and the convolutional layer 503 is directly inputted to the concatenation layer 504.

After disabling each first operator and the second operator, the computer device determines a plurality of input ranges of the concatenation layer and an output range of the concatenation layer. Because the concatenation layer correspondingly has a plurality of pieces of input data, value ranges to which the plurality of pieces of input data belong are the plurality of input ranges of the concatenation layer. The plurality of pieces of input data are in a one-to-one correspondence with a plurality of first operators. Therefore, it may be determined that the plurality of input ranges of the concatenation layer are respectively third input ranges of corresponding first operators. Because the output data of the concatenation layer is input data of the second operator, it may be determined that the output range of the concatenation layer is the third input range of the second operator. For example, in the first model shown in FIG. 5, output data of each convolutional layer is input data of the concatenation layer 504, the concatenation layer 504 correspondingly has three pieces of input data, output data of the convolutional layer 501 corresponds to the pseudo-quantization operator 505, output data of the convolutional layer 502 corresponds to the pseudo-quantization operator 506, and output data of the convolutional layer 503 corresponds to the pseudo-quantization operator 507.

In an implementation, the computer device acquires a plurality of pieces of test data, and calls the first model in which the plurality of first operators and the second operator are disabled to process the plurality of pieces of test data, so as to determine the plurality of input ranges of the concatenation layer and the output range of the concatenation layer. A process of this step is similar to the process of determining the input range of each operator in step 302. A difference lies in that, because the first operator and the second operator are disabled in step 702, during processing performed by the first model on each piece of test data, the data does not need to go through the first operator and the second operator, but a plurality of pieces of test data are separately inputted to the concatenation layer. The computer device collects statistics on values of the plurality of pieces of data inputted to the concatenation layer, and determines the plurality of input ranges of the concatenation layer based on the values of the plurality of pieces of data, so that the plurality of input ranges of the concatenation layer are used as the third input ranges of the plurality of first operators. In this way, a scenario in which "data passes through the first operator but the first operator does not process the data" can be simulated. Similarly, the computer device collects statistics on values of data outputted by the concatenation layer, and determines the output range of the concatenation layer, so that the output range of the concatenation layer is used as the third input range of the second operator. In this way, a scenario in which "data passes through the second operator but the second operator does not process the data" can be simulated.

703: The computer device updates a quantization parameter of each first operator and a quantization parameter of the second operator based on a third input range of each first operator, the third input range of the second operator, and a target output range.

A process of step 703 is similar to that of step 603 and step 604. Details are not described herein again.

704: The computer device enables each first operator and the second operator in the first model, and determines a fourth input range of each first operator and a fourth input range of the second operator.

After the computer device updates the quantization parameter of the first operator and the quantization parameter of the second operator when the first operator and the second operator are disabled, the computer device re-enables each first operator and the second operator in the first model. When the computer device calls the first model to process data, output data of a network layer located before the first operator is first processed by the first operator, and then output data of the first operator is processed by the concatenation layer; and output data of the concatenation layer is first processed by the second operator, and then a network layer located after the second operator continues to process output data of the second operator. After enabling each first operator and the second operator, the computer device re-determines the fourth input range of each first operator and the fourth input range of the second operator. A process of this step is similar to the process of determining the input range of each operator in step 302. Details are not described herein again.

705: The computer device continues to update the quantization parameter of each first operator and the quantization parameter of the second operator based on the fourth input range of each first operator, the fourth input range of the second operator, and the target output range, so that the quantization parameter of each first operator and the quantization parameter of the second operator converge to a quantization parameter corresponding to the target output range.

The quantization parameter corresponding to the target output range is used for quantizing any data into the target output range. A process of this step is similar to that of step 603 and step 604. Details are not described herein again.

In this embodiment of this application, when the first operator and the second operator are disabled, the first operator and the second operator do not process data, and the third input ranges of the first operator and the second operator that are determined in this case are not affected by the first operator and the second operator, thereby reducing an error caused by processing data by the first operator and the second operator. Therefore, the third input ranges determined by the computer device are more accurate, and quantization parameters updated based on the third input ranges are more accurate. Then, the first operator and the second operator, whose quantization parameters are updated, are enabled. As a result, more accurate quantization parameters are used for processing data to obtain new input ranges, and the quantization parameters continue to be updated. This helps improve accuracy of an entire quantization parameter update process. For example, in this embodiment of this application, the first operator and the second operator are pseudo-quantization operators, and a pseudo-quantization operator includes a quantization operator and a dequantization operator. Therefore, both the first operator and the second operator need to first quantize data and then dequantize data. In this process, an error is caused by quantization, and consequently, a determined input range is inaccurate. Therefore, in this embodiment of this application, the first operator and the second operator are first disabled for determining input ranges of the first operator and the second operator, thereby avoiding an error caused by quantization and making a quantization parameter update process more accurate.

In this embodiment of this application, one round is merely used as an example for description. In another embodiment, the computer device repeatedly performs step 702 to step 705 to update the quantization parameter of the first operator and the quantization parameter of the second operator for a plurality of times through a plurality of rounds, so that the quantization parameter of each first operator and the quantization parameter of the second operator converge to the quantization parameter corresponding to the target output range. In addition, when the quantization parameters are updated based on input ranges in each round, input ranges in the round and input ranges in a previous round may be comprehensively considered. A detailed process is similar to the update process based on input ranges in two rounds in the embodiment of FIG. 3. Details are not described herein again.

706: The computer device quantizes a network parameter of a concatenation layer based on the quantization parameter corresponding to the target output range.

A process of step 706 is similar to that of step 305. Details are not described herein again.

According to the method provided in this embodiment of this application, the quantization parameter of each operator is updated by using the input range of each operator and the target output range, so that the quantization parameter of each operator converges to the quantization parameter corresponding to the target output range. In this way, a consistency constraint is performed on output ranges of a plurality of operators by using the target output range, so that the output ranges of the operators remain the same. This is equivalent to ensuring that a plurality of input ranges and network parameter ranges of the concatenation layer are the same, thereby completing quantization of the concatenation layer. In addition, when the first operator and the second operator are disabled, the third input ranges of the first operator and the second operator that are determined in this case are not affected by the first operator and the second operator, thereby reducing an error caused by processing data by the first operator and the second operator. Therefore, the third input ranges determined by the computer device are more accurate, and quantization parameters updated based on the third input ranges are more accurate. Then, the first operator and the second operator, whose quantization parameters are updated, are enabled. As a result, more accurate quantization parameters are used for processing data to obtain new input ranges, and the quantization parameters continue to be updated. This helps improve accuracy of an entire quantization parameter update process.

The foregoing embodiments are applied to a scenario in which any type of first model including a concatenation layer is quantized. For example, the first model is a first image segmentation model, and the first image segmentation model is used for segmenting an image. FIG. 8 is a flowchart of an image segmentation model quantization method according to an embodiment of this application. As shown in FIG. 8, the method includes the following steps:

801: A computer device acquires a first image segmentation model, the first image segmentation model including a plurality of first operators, a concatenation layer, and a second operator.

802: The computer device determines an input range of each of the plurality of first operators and the second operator, and updates a quantization parameter of each operator based on the input range of each operator and a target output range, so that the quantization parameter of each operator converges to a quantization parameter corresponding to the target output range.

803: The computer device quantizes a network parameter of the concatenation layer based on the quantization parameter corresponding to the target output range, to obtain a quantized image segmentation model.

804: The computer device calls the quantized image segmentation model to perform an image segmentation task.

For example, where the image segmentation model is used for cutting a character area from an image, the computer device captures, by using the camera, an original image including a character, and calls the quantized image segmentation model to segment the original image, to obtain a target image including only a character area, so as to implement segmentation of the image.

Alternatively, where the image segmentation model is used for cutting a face area from an image, the computer device captures, by using the camera, an original image including a face, and calls the quantized image segmentation model to segment the original image, to obtain a target image including a face area, so as to implement segmentation of the image. In addition, facial recognition may be subsequently performed based on the target image, to determine whether the face area in the target image is a target face; or other processing is performed on the target image.

Alternatively, in a case that the image segmentation model is used for cutting an environment element, the computer device captures, by using the camera, an environment image including an environment element, and calls the quantized image segmentation model to segment the original image, to obtain a target image including the environment element. For example, the environment element is the sky. In this case, the camera is used to capture a sky image including the sky, and the quantized image segmentation model is called to segment the sky image, to obtain a sky area in the sky image.

In this embodiment of this application, the image segmentation model is used as an example for description. A specific process of steps 801 to 804 is similar to those in the embodiments shown in FIG. 2 to FIG. 7, and details are not described herein again.

According to the method provided in this embodiment of this application, the quantization parameter of each operator is updated by using the input range of each operator and the target output range, so that the quantization parameter of each operator converges to the quantization parameter corresponding to the target output range. In this way, a consistency constraint is performed on output ranges of a plurality of operators by using the target output range, so that the output ranges of the operators remain the same. This is equivalent to ensuring that a plurality of input ranges and network parameter ranges of the concatenation layer are the same, thereby completing quantization of the concatenation layer. In addition, integer data does not need to be converted into floating-point data, thereby helping improve processing efficiency of an image segmentation model, and therefore improving image segmentation efficiency.

Figure 9:
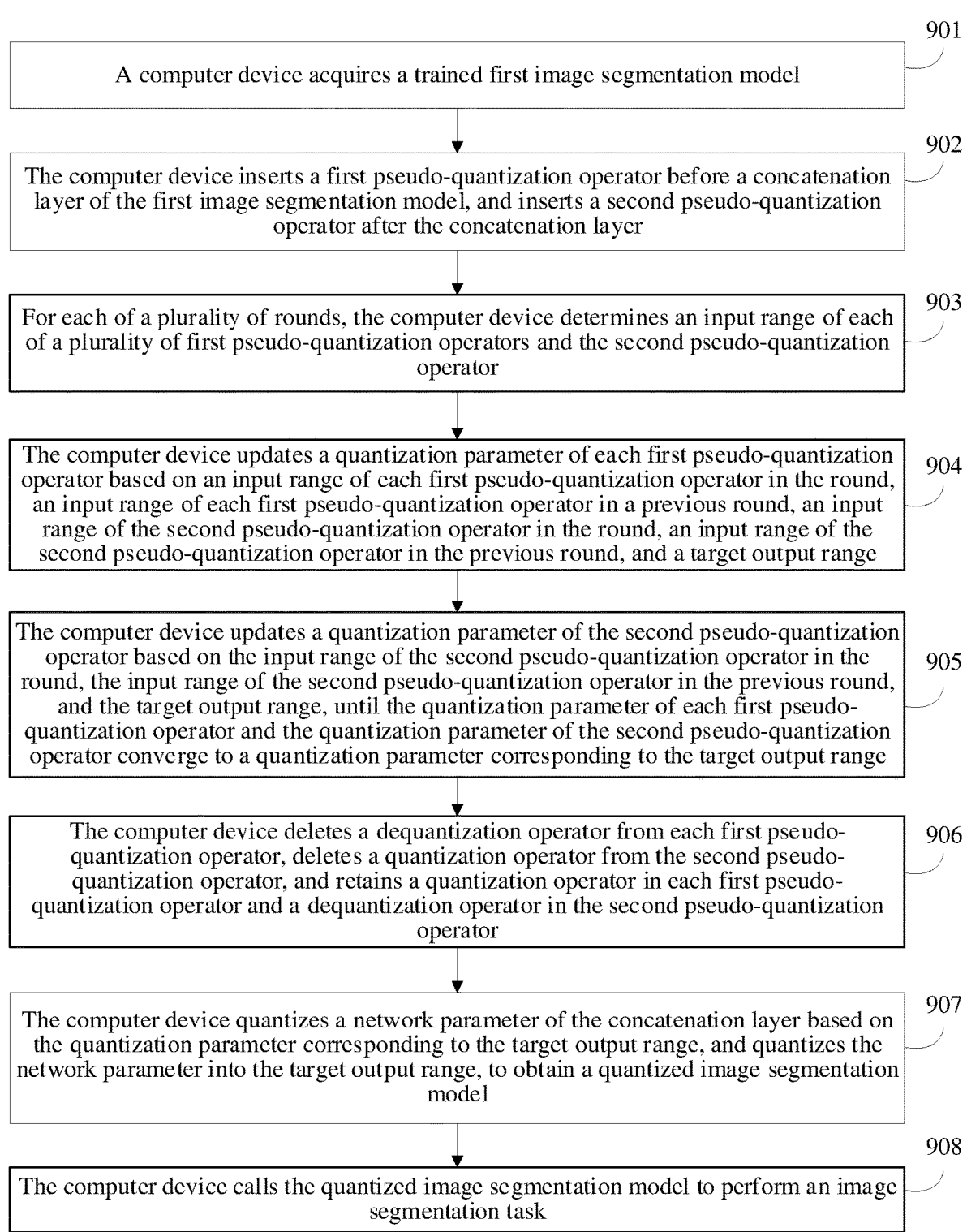
FIG. 9 is a flowchart of another image segmentation model quantization method according to an embodiment of this application.

FIG. 9 is a flowchart of another image segmentation model quantization method according to an embodiment of this application. As shown in FIG. 9, the method includes the following steps:

901: A computer device acquires a trained first image segmentation model.

902: The computer device inserts a first pseudo-quantization operator before a concatenation layer of the first image segmentation model, and inserts a second pseudo-quantization operator after the concatenation layer.

903: For each of a plurality of rounds, the computer device determines an input range of each of a plurality of first pseudo-quantization operators and the second pseudo-quantization operator.

The computer device calls the first image segmentation model to process a plurality of pieces of test data to determine the input range of each pseudo-quantization operator. For example, the plurality of pieces of test data are a plurality of images captured by a camera. For example, each image includes a character area and a background area. The first image segmentation model segments the image to cut the character area and the background area from the image.

904: The computer device updates a quantization parameter of each first pseudo-quantization operator based on an input range of each first pseudo-quantization operator in the round, an input range of each first pseudo-quantization operator in a previous round, an input range of the second pseudo-quantization operator in the round, an input range of the second pseudo-quantization operator in the previous round, and a target output range.

905: The computer device updates a quantization parameter of the second pseudo-quantization operator based on the input range of the second pseudo-quantization operator in the round, the input range of the second pseudo-quantization operator in the previous round, and the target output range, until the quantization parameter of each first pseudo-quantization operator and the quantization parameter of the second pseudo-quantization operator converge to a quantization parameter corresponding to the target output range.

906: The computer device deletes a dequantization operator from each first pseudo-quantization operator, deletes a quantization operator from the second pseudo-quantization operator, and retains a quantization operator in each first pseudo-quantization operator and a dequantization operator in the second pseudo-quantization operator.

907: The computer device quantizes a network parameter of the concatenation layer based on the quantization parameter corresponding to the target output range, and quantizes the network parameter into the target output range, to obtain a quantized image segmentation model.

908: The computer device calls the quantized image segmentation model to perform an image segmentation task.

For example, where the image segmentation model is used for cutting a character area from an image, the computer device captures, by using the camera, an original image including a character, and calls the quantized image segmentation model to segment the original image, to obtain a target image including only a character area, so as to implement segmentation of the image.

Alternatively, where the image segmentation model is used for cutting a face area from an image, the computer device captures, by using the camera, an original image including a face, and calls the quantized image segmentation model to segment the original image, to obtain a target image including a face area, so as to implement segmentation of the image. In addition, facial recognition may be subsequently performed based on the target image, to determine whether the face area in the target image is a target face; or other processing is performed on the target image.

Alternatively, where the image segmentation model is used for cutting an environment element, the computer device captures, by using the camera, an environment image including an environment element, and calls the quantized image segmentation model to segment the original image, to obtain a target image including the environment element. For example, the environment element is the sky. In this case, the camera is used to capture a sky image including the sky, and the quantized image segmentation model is called to segment the sky image, to obtain a sky area in the sky image.

In this embodiment of this application, to improve operation efficiency of the concatenation layer in the image segmentation model, the first pseudo-quantization operator and the second pseudo-quantization operator are inserted before and after the concatenation layer respectively, for performing quantization perception training. In addition, the input range of the second pseudo-quantization operator after the concatenation layer is broadcast to the first pseudo-quantization operator before the concatenation layer, so that a consistency constraint is performed on the input range of each first pseudo-quantization operator by using the input range of the second pseudo-quantization operator. In this way, the quantization parameter of each first pseudo-quantization operator and the quantization parameter of the second pseudo-quantization operator are the same, so that a plurality of pieces of integer data inputted to the concatenation layer all belong to a same range, and the integer data does not need to be converted into floating-point data, thereby helping improve processing efficiency of the model.

In addition to the image segmentation model, the first model may alternatively be any type of neural network model, such as a facial recognition model, an image classification model, a speech recognition model, or an image denoising model. This is not limited in this embodiment of this application. For example, the quantized first model is a first facial recognition model, and the first facial recognition model is used for performing a facial recognition task, where the facial recognition task is to recognize whether a face in an image is a target face. That the computer device performs a facial recognition task includes: acquiring a face image, and calling a facial recognition model obtained by quantizing the facial recognition model to perform facial recognition on the face image, to obtain a facial recognition result, the facial recognition result indicating whether a face in the face image is a target face.

For example, the quantized first model is a first image classification model, and the first image classification model is used for performing an image classification task to determine a category to which an image belongs. There are a plurality of image categories. For example, the image categories include a landscape image and a character image, and the quantified image classification model is used for classifying a landscape image and a character image. The computer device acquires a to-be-detected image from an image library, and calls the image classification model to classify the to-be-detected image to obtain a classification result, where the classification result indicates whether the to-be-detected image is a landscape image or a character image.

To verify feasibility of this embodiment of this application, a floating-point model used for image segmentation is acquired. The floating-point model includes at least one concatenation layer, and the at least one concatenation layer is not quantized, and can process only floating-point data. The floating-point model is quantized by using the method in this embodiment of this application, to obtain an 8-bit quantization model. The floating-point model and the 8-bit quantization model are called to process a same batch of data, and processing results are shown in Table 1 below.

TABLE 1

| Model | Contour boundary IOU | Overall IOU |
|---|---|---|
| Floating-point model | 0.5857 | 0.8336 |
| 8-bit quantization model | 0.5861 | 0.8365 |

A processing speed of the 8-bit quantization model is higher than that of the floating-point model. The intersection over union (IOU) is a criterion for measuring accuracy. The contour boundary IOU indicates a degree of overlapping between a contour of an image obtained through segmentation by the model and a contour of a real image. The overall IOU indicates a degree of overall overlapping between the image obtained through segmentation by the model and the real image. It can be learned from Table 1 that accuracy of the 8-bit quantization model is higher than that of the floating-point model.

Figure 10:
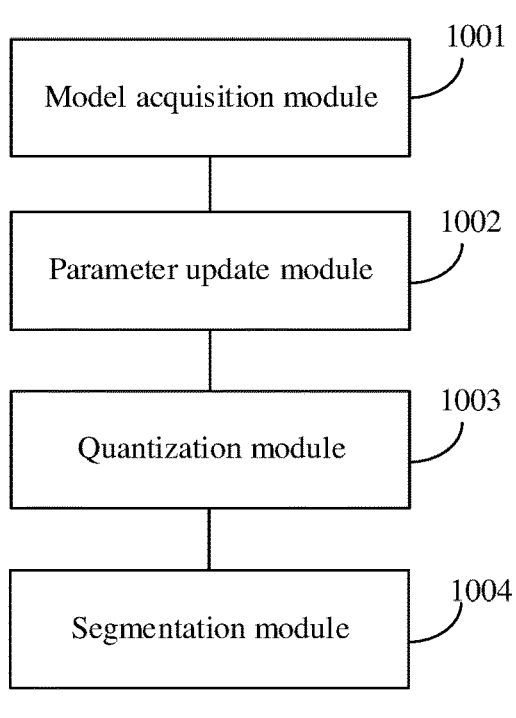
FIG. 10 is a schematic structural diagram of an image segmentation model quantization apparatus according to an embodiment of this application.

FIG. 10 is a schematic structural diagram of an image segmentation model quantization apparatus according to an embodiment of this application. As shown in FIG. 10, the apparatus includes:

a model acquisition module 1001, configured to acquire a first image segmentation model, the first image segmentation model including a plurality of first operators, a concatenation layer, and a second operator, outputs of the first operators being inputs of the concatenation layer, and an output of the concatenation layer being an input of the second operator;

a parameter update module 1002, configured to determine an input range of each of the plurality of first operators and the second operator, and update a quantization parameter of each operator based on the input range of each operator and a target output range, so that the quantization parameter of each operator converges to a quantization parameter corresponding to the target output range, the quantization parameter corresponding to the target output range being used for quantizing any data into the target output range;

a quantization module 1003, configured to quantize a network parameter of the concatenation layer based on the quantization parameter corresponding to the target output range, to obtain a quantized image segmentation model; and a segmentation module 1004, configured to call the quantized image segmentation model to perform an image segmentation task.

According to the image segmentation model quantization apparatus provided in this embodiment of this application, the quantization parameter of each operator is updated by using the input range of each operator and the target output range, so that the quantization parameter of each operator converges to the quantization parameter corresponding to the target output range. In this way, a consistency constraint is performed on output ranges of a plurality of operators by using the target output range, so that the output ranges of the operators remain the same. This is equivalent to ensuring that a plurality of input ranges and network parameter ranges of the concatenation layer are the same, thereby completing quantization of the concatenation layer. In addition, integer data does not need to be converted into floating-point data, thereby helping improve processing efficiency of an image segmentation model, and therefore improving image segmentation efficiency.

In some embodiments, the segmentation module 1004 is configured to:

capture, by using a camera, an original image including a character, and call the quantized image segmentation model to segment the original image, to obtain a target image including a character area; or capture, by using a camera, an original image including a face, and call the quantized image segmentation model to segment the original image, to obtain a target image including a face area; or capture, by using a camera, an environment image including an environment element, and call the quantized image segmentation model to segment the original image, to obtain a target image including the environment element.

Figure 11:
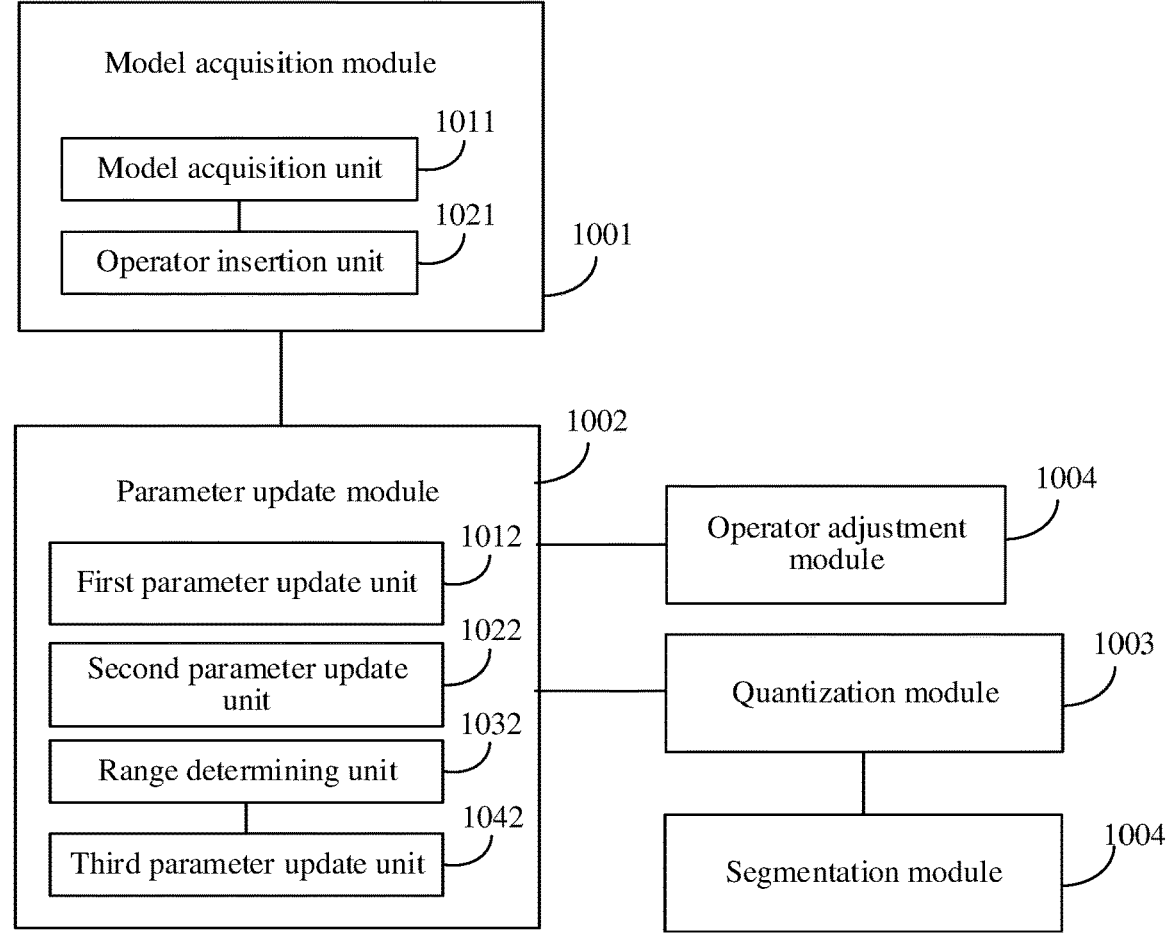
FIG. 11 is a schematic structural diagram of another image segmentation model quantization apparatus according to an embodiment of this application.

In some embodiments, as shown in FIG. 11, the parameter update module 1002 includes:

a first parameter update unit 1012, configured to update a quantization parameter of each first operator based on an input range of each first operator, an input range of the second operator, and the target output range; and a second parameter update unit 1022, configured to update a quantization parameter of the second operator based on the input range of the second operator and the target output range, so that the quantization parameter of each first operator and the quantization parameter of the second operator converge to the quantization parameter corresponding to the target output range.

In some embodiments, as shown in FIG. 11, the parameter update module 1002 includes:

a range determining unit 1032, configured to: for each of a plurality of rounds, determine an input range of each operator in the round; and a third parameter update unit 1042, configured to update the quantization parameter of each operator based on the input range of each operator in the round, an input range of each operator in a previous round of the round, and the target output range, so that the quantization parameter of each operator converges to the quantization parameter corresponding to the target output range.

In some embodiments, as shown in FIG. 11, the range determining unit 1032 is configured to call the first image segmentation model to process a plurality of pieces of test data corresponding to the round, to determine the input range of each operator in the round, a plurality of pieces of test data corresponding to each round varying.

In some embodiments, as shown in FIG. 11, the third parameter update unit 1042 is configured to:

update a quantization parameter of each first operator based on an input range of each first operator in the round, an input range of each first operator in the previous round, an input range of the second operator in the round, an input range of the second operator in the previous round, and the target output range; and update a quantization parameter of the second operator based on the input range of the second operator in the round, the input range of the second operator in the previous round, and the target output range, until the quantization parameter of each first operator and the quantization parameter of the second operator converge to the quantization parameter corresponding to the target output range.

In some embodiments, as shown in FIG. 11, the third parameter update unit 1042 is configured to:

weight the input range of each first operator in the round and the input range of each first operator in the previous round, to obtain a first input range of each first operator;

weight the input range of the second operator in the round and the input range of the second operator in the previous round, to obtain a second input range of the second operator; and update the quantization parameter of each first operator based on the first input range of each first operator, the second input range, and the target output range.

In some embodiments, as shown in FIG. 11, the third parameter update unit 1042 is configured to:

determine a first weight parameter corresponding to each first operator, and a second weight parameter corresponding to the second operator, the first weight parameter being negatively correlated with the number of updates of the quantization parameter, and the second weight parameter being positively correlated with the number of updates;

weight the first input range of each first operator and the second input range based on the first weight parameter and the second weight parameter, to obtain a target input range of each first operator; and update the quantization parameter of each first operator based on the target input range of each first operator and the target output range, so that an updated quantization parameter is capable of quantizing data within the target input range into the target output range.

In some embodiments, as shown in FIG. 11, the third parameter update unit 1042 is configured to:

for each first operator, weight, based on a first weight parameter of the first operator and the second weight parameter, a minimum value within a first input range of the first operator and a minimum value within the second input range, to obtain a target minimum value;

weight, based on the first weight parameter and the second weight parameter, a maximum value within the first input range and a maximum value within the second input range, to obtain a target maximum value; and determine that a range between the target minimum value and the target maximum value is a target input range of the first operator.

In some embodiments, as shown in FIG. 11, the first operator includes a first quantization parameter, and the third parameter update unit 1042 is configured to:

for each first operator, determine a first difference between a maximum value and a minimum value within a target input range of the first operator;

determine a second difference between a maximum value and a minimum value within the target output range; and determine that a ratio of the first difference to the second difference is an updated first quantization parameter of the first operator, the first quantization parameter indicating a scaling ratio of data.

In some embodiments, as shown in FIG. 11, the first operator further includes a second quantization parameter, and the third parameter update unit 1042 is configured to:

round a ratio of the minimum value within the target input range to the updated first quantization parameter, to obtain a reference minimum value; and determine that a difference between the minimum value within the target output range and the reference minimum value is an updated second quantization parameter of the first operator, the second quantization parameter indicating a shift magnitude of data.

In some embodiments, as shown in FIG. 11, the third parameter update unit 1042 is configured to:

weight the input range of the second operator in the round and the input range of the second operator in the previous round, to obtain a second input range of the second operator; and update the quantization parameter of the second operator based on the second input range of the second operator and the target output range, so that an updated quantization parameter is capable of quantizing data within the second input range into the target output range.

In some embodiments, as shown in FIG. 11, the parameter update module 1002 includes:

a range determining unit 1032, configured to disable each first operator and the second operator in the first image segmentation model, determine that a plurality of input ranges of the concatenation layer are respectively third input ranges of corresponding first operators, and determine that an output range of the concatenation layer is a third input range of the second operator; and a third parameter update unit 1042, configured to update a quantization parameter of each first operator and a quantization parameter of the second operator based on a third input range of each first operator, the third input range of the second operator, and the target output range, the range determining unit 1032 being further configured to enable each first operator and the second operator in the first image segmentation model, and determine a fourth input range of each first operator and a fourth input range of the second operator; and the third parameter update unit 1042 being configured to continue to update the quantization parameter of each first operator and the quantization parameter of the second operator based on the fourth input range of each first operator, the fourth input range of the second operator, and the target output range, so that the quantization parameter of each first operator and the quantization parameter of the second operator converge to the quantization parameter corresponding to the target output range.

In some embodiments, as shown in FIG. 11, the first operator includes a first quantization operator and a first dequantization operator, and the apparatus further includes:

an operator adjustment module 1004, configured to delete the first dequantization operator from each first operator, and delete the second quantization operator from the second operator.

In some embodiments, as shown in FIG. 11, the parameter update module 1002 includes:

a range determining unit 1032, configured to acquire association information of the concatenation layer, the association information indicating the first operator located before the concatenation layer and a plurality of second operators located after the concatenation layer, the range determining unit 1032 being further configured to determine the plurality of first operators and the second operator based on the association information; and the range determining unit 1032 being further configured to determine input ranges of the plurality of first operators and an input range of the second operator.

Optionally, as shown in FIG. 11, the model acquisition module 1001 includes:

a model acquisition unit 1011, configured to acquire a second image segmentation model, the second image segmentation model including a plurality of network layers that are connected sequentially, the plurality of network layers including at least the concatenation layer and a plurality of first network layers, and the first network layers being network layers that are connected to the concatenation layer and that are located before the concatenation layer; and an operator insertion unit 1021, configured to insert the first operator between the concatenation layer and each first network layer, and insert the second operator after the concatenation layer, to obtain the first image segmentation model.

In event that the image segmentation model quantization apparatus provided in the foregoing embodiment quantizes a model, the division of the foregoing functional modules is merely used as an example for description. In practical application, the functions may be allocated to and completed by different functional modules according to requirements. That is, an internal structure of a computer device is divided into different functional modules, to complete all or some of the functions described above. In addition, the image segmentation model quantization apparatus provided in the foregoing embodiment and the image segmentation model quantization method embodiments belong to a same concept. For details about a specific implementation process, refer to the method embodiments. Details are not described herein again.

An embodiment of this application further provides a computer device. The computer device includes a processor and a memory. The memory stores at least one computer program. The at least one computer program is loaded and executed by the processor to implement the operations performed in the image segmentation model quantization method in the foregoing embodiments.

Figures 12, 13:
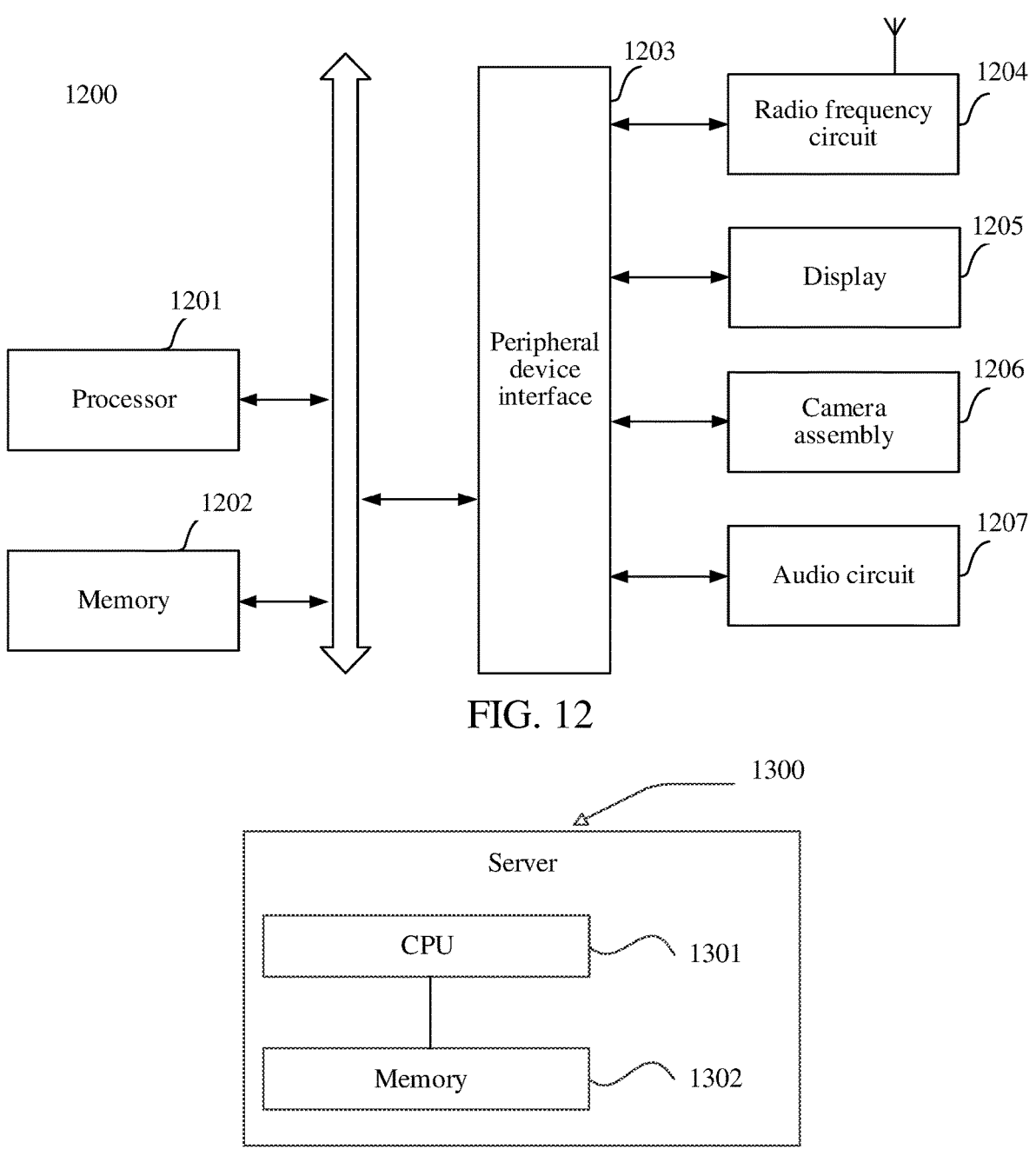
FIG. 12 is a schematic structural diagram of a terminal according to an embodiment of this application.
FIG. 13 is a schematic structural diagram of a server according to an embodiment of this application.

In some embodiments, the computer device is provided as a terminal. FIG. 12 is a schematic structural diagram of a terminal 1200 according to an exemplary embodiment of this application.

The terminal 1200 includes a processor 1201 and a memory 1202.

The processor 1201 may include one or more processing cores, for example, is a 4-core processor or an 8-core processor. The processor 1201 may be implemented in at least one hardware form of a digital signal processor (DSP), a field-programmable gate array (FPGA), and a programmable logic array (PLA). In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process computing operations related to machine learning.

The memory 1202 may include one or more computer-readable storage media. The computer-readable storage medium may be non-transitory. In some embodiments, the non-transitory computer-readable storage medium in the memory 1202 is configured to store at least one computer program, and the at least one computer program is executed by the processor 1201 to implement the image segmentation model quantization method provided in the method embodiments of this application.

In some embodiments, optionally, the terminal 1200 further includes a peripheral device interface 1203 and at least one peripheral device. The processor 1201, the memory 1202, and the peripheral device interface 1203 may be connected through a bus or a signal cable. Each peripheral device may be connected to the peripheral device interface 1203 through a bus, a signal cable, or a circuit board. Optionally, the peripheral device includes at least one of a radio frequency circuit 1204, a display screen 1205, a camera assembly 1206, and an audio circuit 1207.

The peripheral device interface 1203 may be configured to connect at least one input/output (I/O)-related peripheral device to the processor 1201 and the memory 1202. In some embodiments, the processor 1201, the memory 1202, and the peripheral device interface 1203 are integrated on one chip or circuit board. In some other embodiments, any one or two of the processor 1201, the memory 1202, and the peripheral device interface 1203 may be implemented on a separate chip or circuit board. This is not limited in this embodiment.

The radio frequency circuit 1204 is configured to receive and transmit a radio frequency (RF) signal, also referred to as an electromagnetic signal. The radio frequency circuit 1204 communicates with a communications network and another communications device through the electromagnetic signal. The radio frequency circuit 1204 converts an electrical signal into an electromagnetic signal for transmission, or converts a received electromagnetic signal into an electrical signal.

The display screen 1205 is configured to display a user interface (UI). The UI may include a graph, text, an icon, a video, and any combination thereof. In a case that the display screen 1205 is a touch display screen, the display screen 1205 further has a capability of acquiring a touch signal on or above a surface of the display screen 1205. The touch signal may be inputted to the processor 1201 as a control signal for processing. In this case, the display screen 1205 may be further configured to provide a virtual button and/or a virtual keyboard, also referred to as a soft button and/or a soft keyboard.

The camera assembly 1206 is configured to capture images or videos. In some embodiments, the camera assembly 1206 includes a front-facing camera and a rear-facing camera. The front-facing camera is disposed on a front panel of the terminal 1200, and the rear-facing camera is disposed on a rear side of the terminal 1200.

The audio circuit 1207 may include a microphone and a speaker. The microphone is configured to acquire sound waves of a user and an environment, convert the sound waves into an electrical signal, and input the electrical signal to the processor 1201 for processing, or input the electrical signal to the radio frequency circuit 1204 for implementing voice communication.

A person skilled in the art may understand that the structure shown in FIG. 12 constitutes no limitation on the terminal 1200, and the terminal may include more or fewer components than those shown in the figure, or some components may be combined, or a different component layout may be used.

In some embodiments, the computer device is provided as a server. FIG. 13 is a schematic structural diagram of a server according to an embodiment of this application. The server 1300 may vary greatly due to different configurations or performance, and may include one or more central processing units (CPUs) 1301 and one or more memories 1302. The memory 1302 stores at least one computer program, and the at least one computer program is loaded and executed by the CPU 1301 to implement the methods provided in the foregoing method embodiments. Certainly, the server may further include components such as a wired or wireless network interface, a keyboard, and an input/output interface, to facilitate input and output. The server may further include another component configured to implement a function of a device. Details are not described herein.

An embodiment of this application further provides a computer-readable storage medium. The computer-readable storage medium stores at least one computer program, and the at least one computer program is loaded and executed by a processor to implement the operations performed in the methods in the foregoing embodiments.

An embodiment of this application further provides a computer program product or a computer program. The computer program product or the computer program includes computer program code. The computer program code is stored in a computer-readable storage medium. A processor of a computer device reads the computer program code from the computer-readable storage medium, and the processor executes the computer program code, so that the computer device implements the operations performed in the methods in the foregoing embodiments.

In some embodiments, a computer program included in the embodiments of this application may be deployed on one computer device for execution, or may be executed on a plurality of computer devices in one location, or may be executed on a plurality of computer devices that are distributed in a plurality of locations and that are interconnected through a communications network. The plurality of computer devices that are distributed in a plurality of locations and that are interconnected through a communications network may form a blockchain system.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of the embodiments of this application, but are not intended to limit the embodiments of this application. Any modification, equivalent replacement, or improvement made within the spirit and principle of the embodiments of this application shall fall within the protection scope of this application.

What is claimed is:

1. An image segmentation model quantization method, the method comprising:

acquiring, by a computer device, a first image segmentation model, the first image segmentation model comprising a plurality of first operators, a concatenation layer, and a second operator, wherein outputs of the first operators are inputs of the concatenation layer, each first operator of the plurality of first operators comprises a first quantization operator and a first dequantization operator, the second operator comprises a second quantization operator and a second dequantization operator, and an output of the concatenation layer is an input of the second operator;

determining, by the computer device, an input range of each of the plurality of first operators and the second operator, and continuing iteratively updating a quantization parameter of each operator based on the input range of each operator and a target output range, until the quantization parameter of each operator converges to a quantization parameter corresponding to the target output range, the quantization parameter corresponding to the target output range used to quantize any data into the target output range;

quantizing, by the computer device, a network parameter of the concatenation layer based on the quantization parameter corresponding to the target output range, to obtain a quantized image segmentation model;

deleting, by the computer device, the first dequantization operator from each first operator, and deleting the second quantization operator from the second operator; and calling the quantized image segmentation model to perform an image segmentation task.

2. The method according to claim 1, wherein the calling the quantized image segmentation model to perform the image segmentation task comprises:

capturing, by using a camera, a first original image comprising a character, and calling the quantized image segmentation model to segment the first original image, to obtain a first target image comprising a character area; or capturing, by using the camera, a second original image comprising a face, and calling the quantized image segmentation model to segment the second original image, to obtain a second target image comprising a face area; or capturing, by using the camera, an environment image comprising an environment element, and calling the quantized image segmentation model to segment a third original image, to obtain a third target image comprising the environment element.

3. The method according to claim 1, wherein continuing iteratively updating, by the computer device, the quantization parameter of each operator based on the input range of each operator and the target output range, until the quantization parameter of each operator converges to the quantization parameter corresponding to the target output range comprises:

updating, by the computer device, a quantization parameter of each first operator based on an input range of each first operator, an input range of the second operator, and the target output range; and updating, by the computer device, a quantization parameter of the second operator based on the input range of the second operator and the target output range, so that the quantization parameter of each first operator and the quantization parameter of the second operator converge to the quantization parameter corresponding to the target output range.

4. The method according to claim 1, wherein the determining, by the computer device, the input range of each of the plurality of first operators and the second operator, and continuing iteratively updating the quantization parameter of each operator based on the input range of each operator and the target output range, until the quantization parameter of each operator converges to the quantization parameter corresponding to the target output range comprises:

for each of a plurality of rounds, determining, by the computer device, an input range of each operator in each of the plurality of rounds; and updating, by the computer device, the quantization parameter of each operator based on the input range of each operator in each of the plurality of rounds, an input range of each operator in a previous round of each of the plurality of rounds, and the target output range, so that the quantization parameter of each operator converges to the quantization parameter corresponding to the target output range.

5. The method according to claim 4, wherein the determining, by the computer device, the input range of each operator in each of the plurality of rounds comprises:

calling, by the computer device, the first image segmentation model to process a plurality of pieces of test data corresponding to each of the plurality of rounds, to determine the input range of each operator in each of the plurality of rounds, a plurality of pieces of test data corresponding to each round varying.

6. The method according to claim 4, wherein the updating, by the computer device, the quantization parameter of each operator based on the input range of each operator in each of the plurality of rounds, the input range of each operator in the previous round of each of the plurality of rounds, and the target output range, so that the quantization parameter of each operator converges to the quantization parameter corresponding to the target output range comprises:

updating, by the computer device, a quantization parameter of each first operator based on an input range of each first operator in each of the plurality of rounds, an input range of each first operator in the previous round, an input range of the second operator in each of the plurality of rounds, an input range of the second operator in the previous round, and the target output range; and updating, by the computer device, a quantization parameter of the second operator based on the input range of the second operator in each of the plurality of rounds, the input range of the second operator in the previous round, and the target output range, until the quantization parameter of each first operator and the quantization parameter of the second operator converge to the quantization parameter corresponding to the target output range.

7. The method according to claim 6, wherein the updating, by the computer device, the quantization parameter of each first operator based on the input range of each first operator in each of the plurality of rounds, the input range of each first operator in the previous round, the input range of the second operator in each of the plurality of rounds, the input range of the second operator in the previous round, and the target output range comprises:

weighting, by the computer device, the input range of each first operator in each of the plurality of rounds and the input range of each first operator in the previous round, to obtain a first input range of each first operator;

weighting, by the computer device, the input range of the second operator in each of the plurality of rounds and the input range of the second operator in the previous round, to obtain a second input range of the second operator; and updating, by the computer device, the quantization parameter of each first operator based on the first input range of each first operator, the second input range, and the target output range.

8. The method according to claim 7, wherein the updating, by the computer device, the quantization parameter of each first operator based on the first input range of each first operator, the second input range, and the target output range comprises:

determining, by the computer device, a first weight parameter corresponding to each first operator, and a second weight parameter corresponding to the second operator, the first weight parameter being negatively correlated with a number of updates of the quantization parameter, and the second weight parameter being positively correlated with the number of updates;

weighting, by the computer device, the first input range of each first operator and the second input range based on the first weight parameter and the second weight parameter, to obtain a target input range of each first operator; and updating, by the computer device, the quantization parameter of each first operator based on the target input range of each first operator and the target output range, so that an updated quantization parameter is capable of quantizing data within the target input range into the target output range.

9. The method according to claim 8, wherein the weighting, by the computer device, the first input range of each first operator and the second input range based on the first weight parameter and the second weight parameter, to obtain the target input range of each first operator comprises:

for each first operator, weighting, by the computer device based on a first weight parameter of the first operator and the second weight parameter, a minimum value within a first input range of the first operator and a minimum value within the second input range, to obtain a target minimum value;

weighting, by the computer device based on the first weight parameter and the second weight parameter, a maximum value within the first input range and a maximum value within the second input range, to obtain a target maximum value; and determining, by the computer device, that a range between the target minimum value and the target maximum value is a target input range of the first operator.

10. The method according to claim 8, wherein the first operator comprises a first quantization parameter, and the updating, by the computer device, the quantization parameter of each first operator based on the target input range of each first operator and the target output range, so that the updated quantization parameter is capable of quantizing data within the target input range into the target output range comprises:

for each first operator, determining, by the computer device, a first difference between a maximum value and a minimum value within a target input range of the first operator;

determining, by the computer device, a second difference between a maximum value and a minimum value within the target output range; and determining, by the computer device, that a ratio of the first difference to the second difference is an updated first quantization parameter of the first operator, the first quantization parameter indicating a scaling ratio of data.

11. The method according to claim 10, wherein the first operator further comprises a second quantization parameter, and the updating, by the computer device, the quantization parameter of each first operator based on the target input range of each first operator and the target output range, so that the updated quantization parameter is capable of quantizing data within the target input range into the target output range comprises:

rounding, by the computer device, a ratio of the minimum value within the target input range to the updated first quantization parameter, to obtain a reference minimum value; and determining, by the computer device, that a difference between the minimum value within the target output range and the reference minimum value is an updated second quantization parameter of the first operator, the second quantization parameter indicating a shift magnitude of data.

12. The method according to claim 1, wherein determining, by the computer device, the input range of each of the plurality of first operators and the second operator, and continuing iteratively updating the quantization parameter of each operator based on the input range of each operator and the target output range, until the quantization parameter of each operator converges to the quantization parameter corresponding to the target output range comprises:

disabling, by the computer device, each first operator and the second operator in the first image segmentation model, determining that a plurality of input ranges of the concatenation layer are respectively third input ranges of corresponding first operators, and determining that an output range of the concatenation layer is a third input range of the second operator;

updating, by the computer device, a quantization parameter of each first operator and a quantization parameter of the second operator based on a third input range of each first operator, the third input range of the second operator, and the target output range;

enabling, by the computer device, each first operator and the second operator in the first image segmentation model, and determining a fourth input range of each first operator and a fourth input range of the second operator; and continuing, by the computer device, to update the quantization parameter of each first operator and the quantization parameter of the second operator based on the fourth input range of each first operator, the fourth input range of the second operator, and the target output range, so that the quantization parameter of each first operator and the quantization parameter of the second operator converge to the quantization parameter corresponding to the target output range.

13. An image segmentation model quantization apparatus comprising:

a memory storing a plurality of instructions; and a processor configured to execute the plurality of instructions, and upon execution of the plurality of instructions, the processor is configured to:

acquire a first image segmentation model, the first image segmentation model comprising a plurality of first operators, a concatenation layer, and a second operator, wherein outputs of the first operators are inputs of the concatenation layer, each first operator of the plurality of first operators comprises a first quantization operator and a first dequantization operator, the second operator comprises a second quantization operator and a second dequantization operator, and an output of the concatenation layer is an input of the second operator;

determine an input range of each of the plurality of first operators and the second operator, and continue iteratively updating a quantization parameter of each operator based on the input range of each operator and a target output range, until the quantization parameter of each operator converges to a quantization parameter corresponding to the target output range, the quantization parameter corresponding to the target output range being used for quantizing any data into the target output range;

quantize a network parameter of the concatenation layer based on the quantization parameter corresponding to the target output range, to obtain a quantized image segmentation model;

delete the first dequantization operator from each first operator, and delete the second quantization operator from the second operator; and call the quantized image segmentation model to perform an image segmentation task.

14. The apparatus according to claim 13, wherein in order to call the quantized image segmentation model to perform the image segmentation task, the processor, upon execution of the plurality of instructions, is configured to:

call the quantized image segmentation model to segment a first original image comprising a character to obtain a first target image comprising a character area; or call the quantized image segmentation model to segment a second original image comprising a face, to obtain a second target image comprising a face area; or call the quantized image segmentation model to segment a third original image to obtain a third target image comprising an environment element.

15. The apparatus according to claim 13, wherein in order to continue iteratively updating the quantization parameter of each operator based on the input range of each operator and the target output range, until the quantization parameter of each operator converges to the quantization parameter corresponding to the target output range, the processor, upon execution of the plurality of instructions, is configured to:

update a quantization parameter of each first operator based on an input range of each first operator, an input range of the second operator, and the target output range; and update a quantization parameter of the second operator based on the input range of the second operator and the target output range, so that the quantization parameter of each first operator and the quantization parameter of the second operator converge to the quantization parameter corresponding to the target output range.

16. The apparatus according to claim 13, wherein in order to determine the input range of each of the plurality of first operators and the second operator, and continue iteratively updating the quantization parameter of each operator based on the input range of each operator and the target output range, until the quantization parameter of each operator converges to the quantization parameter corresponding to the target output range, the processor, upon execution of the plurality of instructions, is configured to:

for each of a plurality of rounds, determine an input range of each operator in each of the plurality of rounds; and update the quantization parameter of each operator based on the input range of each operator in each of the plurality of rounds, an input range of each operator in a previous round of each of the plurality of rounds, and the target output range, so that the quantization parameter of each operator converges to the quantization parameter corresponding to the target output range.

17. A non-transitory computer-readable storage medium storing a plurality of instructions executable by a processor, wherein upon execution by the processor, the plurality of instructions is configured to cause the processor to:

acquire a first image segmentation model, the first image segmentation model comprising a plurality of first operators, a concatenation layer, and a second operator, wherein outputs of the first operators are inputs of the concatenation layer, each first operator of the plurality of first operators comprises a first quantization operator and a first dequantization operator, the second operator comprises a second quantization operator and a second dequantization operator, and an output of the concatenation layer is an input of the second operator;

determine an input range of each of the plurality of first operators and the second operator, and continue iteratively updating a quantization parameter of each operator based on the input range of each operator and a target output range, until the quantization parameter of each operator converges to a quantization parameter corresponding to the target output range, the quantization parameter corresponding to the target output range being used for quantizing any data into the target output range;

quantize a network parameter of the concatenation layer based on the quantization parameter corresponding to the target output range, to obtain a quantized image segmentation model;

delete the first dequantization operator from each first operator, and delete the second quantization operator from the second operator; and call the quantized image segmentation model to perform an image segmentation task.

18. The non-transitory computer-readable storage media according to claim 17, wherein in order to determine the input range of each of the plurality of first operators and the second operator, and continue iteratively updating the quantization parameter of each operator based on the input range of each operator and the target output range, until the quantization parameter of each operator converges to the quantization parameter corresponding to the target output range, the plurality of instructions, upon execution by the processor, is configured to cause the processor to:

disable each first operator and the second operator in the first image segmentation model, determine that a plurality of input ranges of the concatenation layer are respectively third input ranges of corresponding first operators, and determine that an output range of the concatenation layer is a third input range of the second operator;

update a quantization parameter of each first operator and a quantization parameter of the second operator based on a third input range of each first operator, the third input range of the second operator, and the target output range;

enable each first operator and the second operator in the first image segmentation model, and determine a fourth input range of each first operator and a fourth input range of the second operator; and continue to update the quantization parameter of each first operator and the quantization parameter of the second operator based on the fourth input range of each first operator, the fourth input range of the second operator, and the target output range, so that the quantization parameter of each first operator and the quantization parameter of the second operator converge to the quantization parameter corresponding to the target output range.

* * * * *